United States Patent
Cui et al.

(10) Patent No.: US 11,937,286 B2
(45) Date of Patent: Mar. 19, 2024

(54) SECONDARY CELL (SCELL) ACTIVATION IN A NEW RADIO (NR) SYSTEM

(71) Applicant: Apple Inc., Cupertino, CA (US)

(72) Inventors: Jie Cui, San Jose, CA (US); Yushu Zhang, Beijing (CN); Yang Tang, San Jose, CA (US); Dawei Zhang, Saratoga, CA (US); Hong He, San Jose, CA (US); Manasa Raghavan, Sunnyvale, CA (US); Huaning Niu, San Jose, CA (US); Haitong Sun, Cupertino, CA (US); Chunhai Yao, Beijing (CN); Wenshu Zhang, San Diego, CA (US)

(73) Assignee: Apple Inc., Cupertino, CA (US)

( * ) Notice: Subject to any disclaimer, the term of this patent is extended or adjusted under 35 U.S.C. 154(b) by 348 days.

(21) Appl. No.: 17/439,330

(22) PCT Filed: Oct. 22, 2020

(86) PCT No.: PCT/CN2020/123005
§ 371 (c)(1),
(2) Date: Sep. 14, 2021

(87) PCT Pub. No.: WO2022/082676
PCT Pub. Date: Apr. 28, 2022

(65) Prior Publication Data
US 2022/0279521 A1    Sep. 1, 2022

(51) Int. Cl.
*H04W 72/54* (2023.01)
*H04W 72/0446* (2023.01)
(Continued)

(52) U.S. Cl.
CPC ..... *H04W 72/542* (2023.01); *H04W 72/0446* (2013.01); *H04W 72/1273* (2013.01); *H04W 72/23* (2023.01)

(58) Field of Classification Search
CPC ........... H04W 72/542; H04W 72/0446; H04W 72/1273; H04W 72/23
See application file for complete search history.

(56) References Cited

U.S. PATENT DOCUMENTS

2018/0192300 A1*  7/2018  Kazmi ................. H04W 16/32
2020/0267764 A1   8/2020  Rastegardoost et al.

FOREIGN PATENT DOCUMENTS

WO    2020164115    8/2020
WO    2020201124    10/2020

OTHER PUBLICATIONS

Qualcomm Incorporated R4-1915190 On Scell activation and deactivation requirements in NR-U Nov. 9, 2019 (Nov. 9, 2019) (Year: 2019).*

(Continued)

*Primary Examiner* — Brenda H Pham
(74) *Attorney, Agent, or Firm* — Kilpatrick Townsend & Stockton LLP

(57) ABSTRACT

The present application relates to devices and components including apparatus, systems, and methods to provide SCell activation. In one example, an SCell activation procedure may be extended by a duration based on cancelation of CSI-RS reception. In another example, a base station may use particular configuration parameters to avoid cancelation of CSI-RS reception. In yet another example, a UE and a base station may use particular information for a CSI-RS reception/transmission on an SCell that is being activated.

20 Claims, 16 Drawing Sheets

(51) Int. Cl.
*H04W 72/1273* (2023.01)
*H04W 72/23* (2023.01)
*H04W 72/542* (2023.01)

(56) References Cited

OTHER PUBLICATIONS

On SCell Activation/De-activation Requirements in NR-U, Qualcomm Incorporated, R4-1915190, Nov. 2019, 8 pages.
Status Report for WI NR-based Access to Unlicensed Spectrum, Qualcomm Incorporated, RP-201141, Jul. 2020, 45 pages.
International Application No. PCT/CN2020/123005, International Search Report and Written Opinion, dated Jul. 14, 2021, 9 pages.
3rd Generation Partnership Project; Technical Specification Group Radio Access Network; NR; Physical layer procedures for control (Release 16), 3GPP TS 38.213 V16.3.0, Sep. 2020, 179 pages.
3rd Generation Partnership Project; Technical Specification Group Radio Access Network; NR; Radio Resource Control (RRC) protocol specification (Release 16), 3GPP TS 38.331 V16.2.0, Sep. 2020, 608 pages.
3rd Generation Partnership Project; Technical Specification Group Radio Access Network; NR; Requirements for support of radio resource management (Release 16), 3GPP TS 38.133 V16.5.0, Sep. 2020, 1608 pages.
The International Application No. PCT/CN2020/123005, "International Preliminary Report on Patentability," dated May 4, 2023, 6 pages.

\* cited by examiner

SECONDARY CELL (SCELL) ACTIVATION IN A NEW RADIO (NR) SYSTEM

This application is a 35 U.S.C. § 371 National Stage Entry of International Application No. PCT/CN2020/123005, filed on Oct. 22, 2020, which is incorporated herein by reference in its entirety for all purposes.

Fifth generation mobile network (5G) is a wireless standard that aims to improve upon data transmission speed, reliability, availability, and more. This standard, while still developing, includes numerous details relating to carrier aggregation (CA), where, for instance, a higher data rate may be achieved by using multiple component carriers (CCs) for communications of a user equipment (UE).

DETAILED DESCRIPTION

Figure 1:
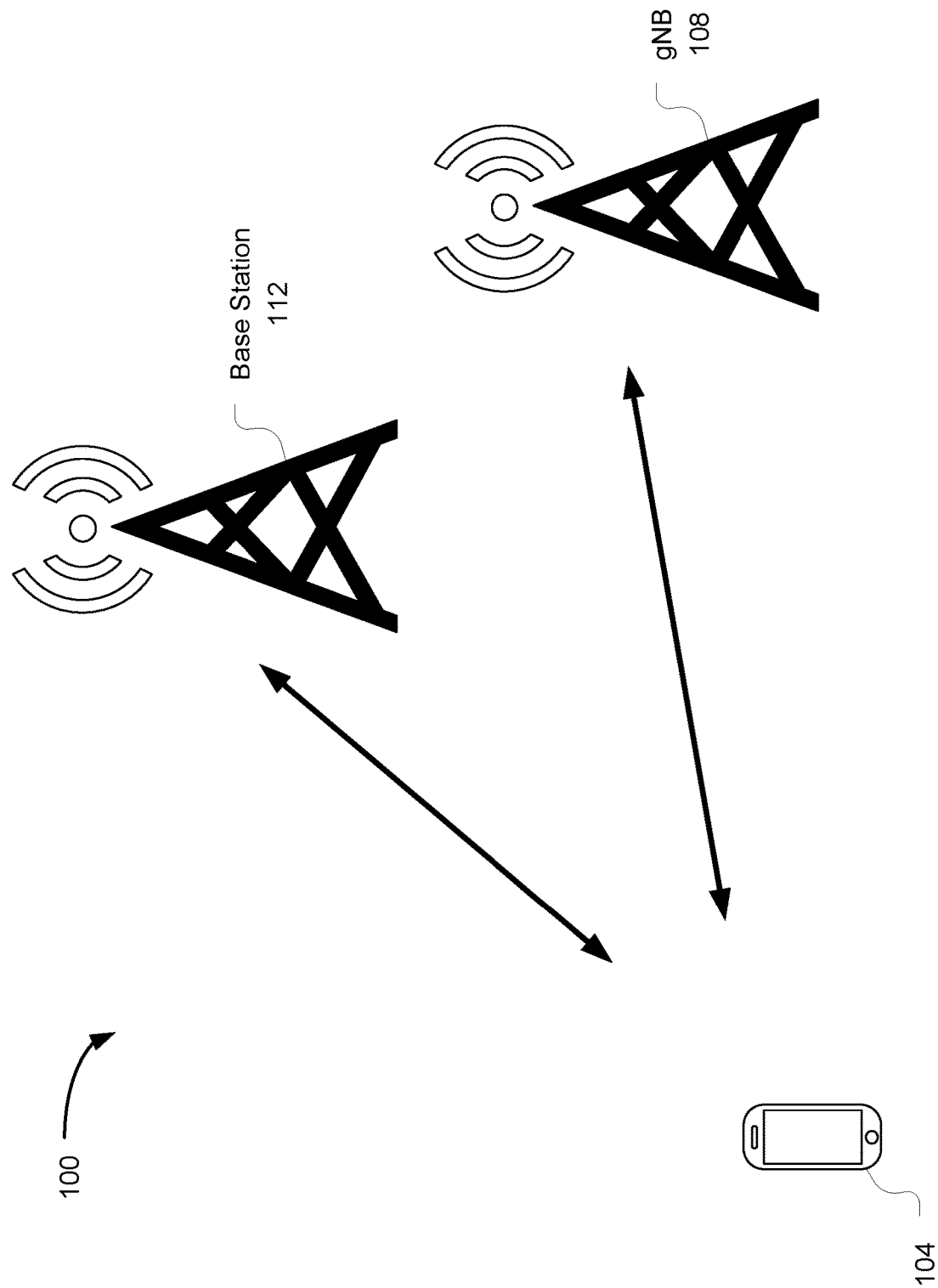
FIG. 1 illustrates an example of a network environment, in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Generally, carrier aggregation (CA) can be used to increase a data rate of user equipment (UE) communications. CA enables a UE to receive and/or transmit from/to multiple cells. The cells include a primary cell (PCell) in the case of a single cell group or a primary secondary cell (PSCell) in case of multiple cell groups. The cells also include a secondary cell (SCell) in both the single and multiple cell group cases. An SCell activation procedure may be performed, whereby the UE and the base station exchange information about the SCell. For instance, the base station sends a channel state information (CSI)-reference signal (RS) on the SCell to the UE, and, in turn, the UE performs measurements based on the CSI-RS and sends a CSI report.

Under certain conditions, the UE may cancel reception of CSI-RS, potentially resulting in cancelation of the SCell activation procedure, an increase to the latency before an SCell is activated, and incapability to increase the data rate meanwhile. To mitigate this scenario, different approaches are possible and can be used in combination or independently of each other. In one example, an SCell activation procedure may be extended by a duration, where the length of the duration is based on the number of canceled CSI-RS receptions, and where this number can be bounded by an upper limit. In another example, a base station may use particular configuration parameters to avoid cancelation of CSI-RS reception by a UE. In yet another example, a UE and a base station may use particular information for a CSI-RS reception/transmission on an SCell that is being activated. In this example, the base station may configure the UE for periodic or semi-persistent CSI-RS reception and subsequently send information indicating an aperiodic CSI-RS reception. In turn, the UE can process the information, receive the aperiodic CSI-RS, and respond with a CSI report.

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer to an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "base station" as used herein refers to a device with radio communication capabilities, that is a network element of a communications network, and that may be configured as an access node in the communications network. A UE's access to the communications network may be managed at least in part by the base station, whereby the UE connects with the base station to access the communications network. Depending on the radio access technology (RAT), the base station can be referred to as a gNodeB (gNB), eNodeB (eNB), access point, etc.

The term "computer system" as used herein refers to any type of interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refer to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100, in accordance with some embodiments. The network environment 100 may include a UE 104 and a gNB 108. The gNB 108 may be a base station that provides a wireless access cell, for example, a Third Generation Partnership Project (3GPP) New Radio (NR) cell, through which the UE 104 may communicate with the gNB 108. The UE 104 and the gNB 108 may communicate over an air interface compatible with 3GPP technical specifications such as those that define Fifth Generation (5G) NR system standards.

The gNB 108 may transmit information (for example, data and control signaling) in the downlink direction by mapping logical channels on the transport channels, and transport channels onto physical channels. The logical channels may transfer data between a radio link control (RLC) and media access control (MAC) layers; the transport channels may transfer data between the MAC and PHY layers; and the physical channels may transfer information across the air interface. The physical channels may include a physical broadcast channel (PBCH), a physical downlink control channel (PDCCH), and a physical downlink shared channel (PDSCH).

The PBCH may be used to broadcast system information that the UE 104 may use for initial access to a serving cell. The PBCH may be transmitted along with physical synchronization signals (PSS) and secondary synchronization signals (SSS) in a synchronization signal (SS)/PBCH block. The SS/PBCH blocks (SSBs) may be used by the UE 104 during a cell search procedure and for beam selection.

The PDSCH may be used to transfer end-user application data, signaling radio bearer (SRB) messages, system information messages (other than, for example, MIB), and paging messages.

The PDCCH may transfer downlink control information (DCI) that is used by a scheduler of the gNB 108 to allocate both uplink and downlink resources. The DCI may also be used to provide uplink power control commands, configure a slot format, or indicate that preemption has occurred.

The gNB 108 may also transmit various reference signals to the UE 104. The reference signals may include demodulation reference signals (DMRSs) for the PBCH, PDCCH, and PDSCH. The UE 104 may compare a received version of the DMRS with a known DMRS sequence that was transmitted to estimate an impact of the propagation channel. The UE 104 may then apply an inverse of the propagation channel during a demodulation process of a corresponding physical channel transmission.

The reference signals may also include CSI-RS. The CSI-RS may be a multi-purpose downlink transmission that may be used for CSI reporting, beam management, connected mode mobility, radio link failure detection, beam failure detection and recovery, and fine tuning of time and frequency synchronization.

The reference signals and information from the physical channels may be mapped to resources of a resource grid. There is one resource grid for a given antenna port, subcarrier spacing configuration, and transmission direction (for example, downlink or uplink). The basic unit of an NR downlink resource grid may be a resource element, which may be defined by one subcarrier in the frequency domain and one orthogonal frequency division multiplexing (OFDM) symbol in the time domain. Twelve consecutive subcarriers in the frequency domain may compose a physical resource block (PRB). A resource element group (REG) may include one PRB in the frequency domain and one OFDM symbol in the time domain, for example, twelve resource elements. A control channel element (CCE) may represent a group of resources used to transmit PDCCH. One CCE may be mapped to a number of REGs, for example, six REGs.

Transmissions that use different antenna ports may experience different radio channels. However, in some situations, different antenna ports may share common radio channel characteristics. For example, different antenna ports may have similar Doppler shifts, Doppler spreads, average delay, delay spread, or spatial receive parameters (for example, properties associated with a downlink received signal angle of arrival at a UE). Antenna ports that share one or more of these large-scale radio channel characteristics may be said to be quasi co-located (QCL) with one another. 3GPP has specified four types of QCL to indicate which particular channel characteristics are shared. In QCL Type A, antenna ports share Doppler shift, Doppler spread, average delay, and delay spread. In QCL Type B, antenna ports share Doppler shift and Doppler spread. In QCL Type C, antenna ports share Doppler shift and average delay. In QCL Type D, antenna ports share spatial receiver parameters.

The gNB 108 may provide transmission configuration indicator (TCI) state information to the UE 104 to indicate QCL relationships between antenna ports used for reference signals (for example, synchronization signal/PBCH or CSI-RS) and downlink data or control signaling, for example, PDSCH or PDCCH. The gNB 108 may use a combination of RRC signaling, MAC control element signaling, and DCI to inform the UE 104 of these QCL relationships.

The UE 104 may transmit data and control information to the gNB 108 using physical uplink channels. Different types of physical uplink channels are possible including, for instance, a physical uplink control channel (PUCCH) and a physical uplink shared channel (PUSCH). Whereas the PUCCH carries control information from the UE 104 to the gNB 108, such as uplink control information (UCI), the PUSCH carries data traffic (e.g., end-user application data) and can carry UCI.

The UE 104 and the gNB 108 may perform beam management operations to identify and maintain desired beams for transmission in the uplink and downlink directions. The beam management may be applied to both PDSCH and PDCCH in the downlink direction, and PUSCH and PUCCH in the uplink direction.

In an example, communications with the gNB 108 and/or the base station can use channels in the frequency range 1 (FR1) band (between 40 Megahertz (MHz) and 7,125 MHz) and/or frequency range 2 (FR2) band (between 24,250 MHz and 52,600 MHz). The FR1 band includes a licensed band and an unlicensed band. The NR unlicensed band (NR-U) includes a frequency spectrum that is shared with other types of radio access technologies (RATs) (e.g., LTE-LAA, WiFi, etc.). A listen-before-talk (LBT) procedure can be used to avoid or minimize collision between the different RATs in the NR-U, whereby a device should applies a clear channel assessment (CCA) check before using the channel.

As further illustrated in FIG. 1, the network environment 100 may further include a base station 112 with which the UE 104 may also connect. The base station 112 supports the same RAT as the gNB 108 (e.g., the base station 112 is also a gNB). Additionally or alternatively, the base station 112 supports a different RAT (e.g., Long-Term Evolution (LTE) eNB).

In an example, the UE 104 supports dual connectivity (DC), whereby the UE 104 can connect and exchange data simultaneously with the gNB 108 and the base station 112. Additionally or alternatively, the UE 104 supports carrier aggregation (CA), whereby the UE 104 can connect and exchange data simultaneously over multiple component carriers (CCs) with the gNB 108 and/or the base station 112. A component carrier can be referred to as a serving cell and can be configured as PCell, PSCell, or an SCell.

To improve resource usage when CA is configured (e.g., processing burden on the UE 104, battery usage of the UE 104, channel management and load balancing, etc.), an activation/deactivation mechanism of SCells is supported. Generally, if the UE 104 is configured with one or more SCells, the gNB 108 may activate and deactivate the configured SCells. Activation and deactivation typically does not apply to a PCell (or PSCell). After an SCell is configured, such as via higher layer signaling, the SCell is in a deactivated state. An SCell activation procedure is used to activate the SCell and enable transmission/reception on the SCell (e.g., on PDSCH, PDCCH, PUSCH of the SCell). The SCell activation procedure may be triggered when, for instance, there is a need of more data throughput or to load balance traffic on the PCell (or PSCell). The SCell can be activated depending on its channel quality and can be deactivated if its channel quality is low.

Figure 3:
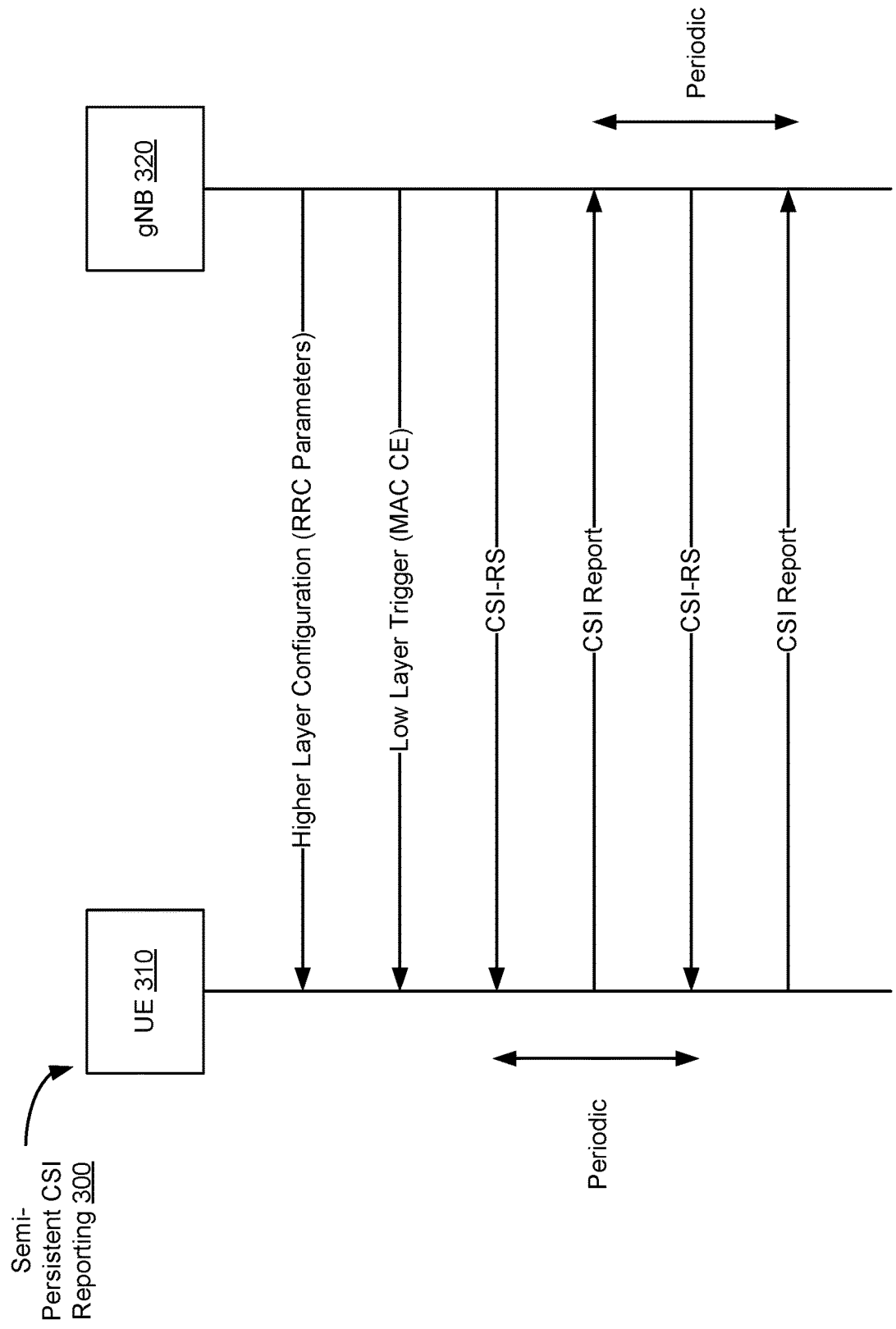
FIG. 3 illustrates examples of semi-persistent CSI reporting, in accordance with some embodiments.
Figure 4:
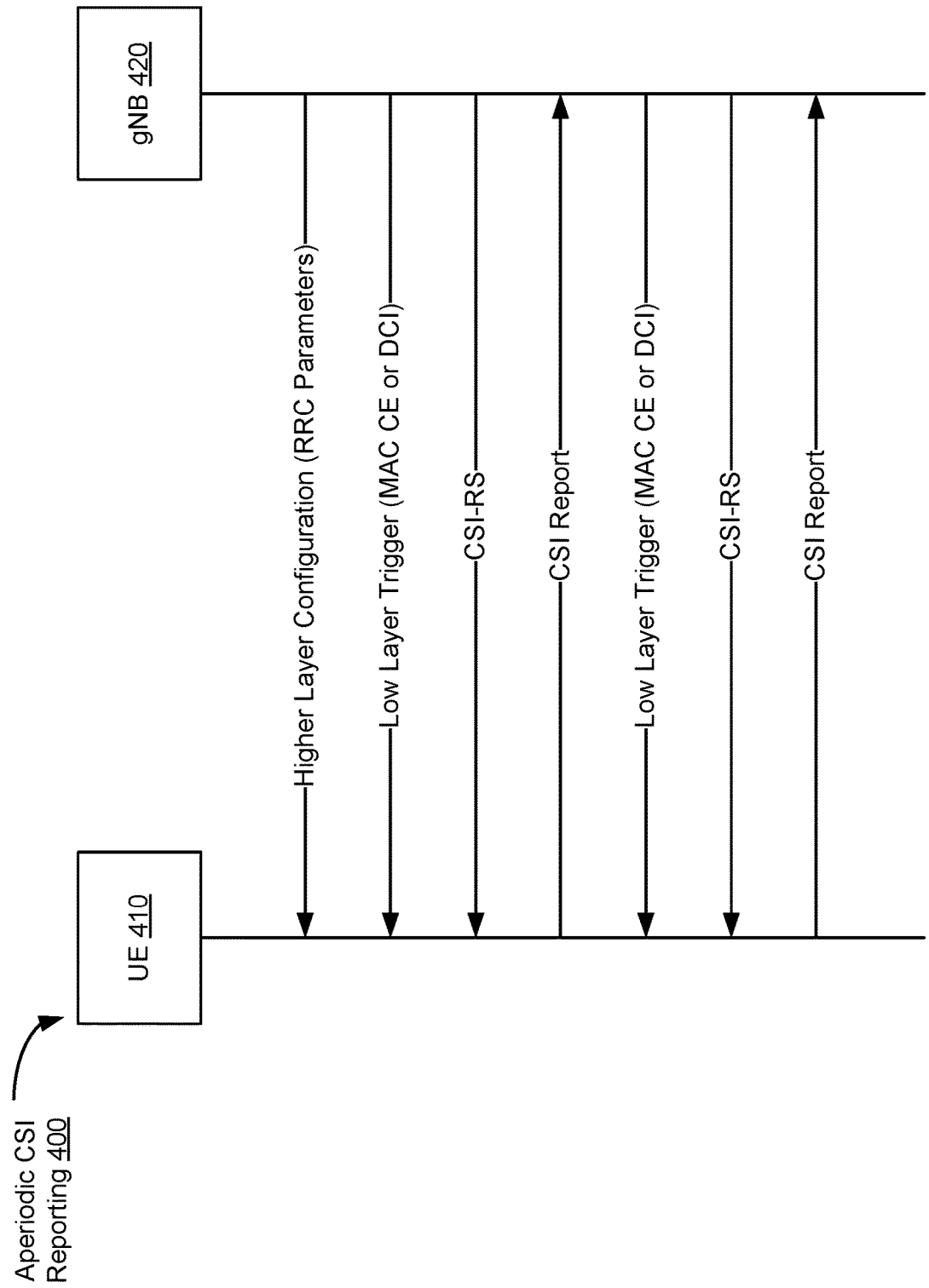
FIG. 4 illustrates an example of aperiodic CSI reporting, in accordance with some embodiments.

Channel state information (CSI) can be used in an SCell activation procedure to determine a channel quality of an SCell. For instance, the gNB 108 may send an CSI-RS signal to the UE 1044 that responds with a CSI report. The report can include a channel quality indicator (CQI), among other information, indicating the SCell's channel quality. Different approaches are possible for the CSI reporting, including periodic CSI reporting as illustrated in FIG. 2, semi-persistent CSI reporting as illustrated in FIG. 3, or aperiodic CSI reporting as illustrated in FIG. 4.

Figure 2:
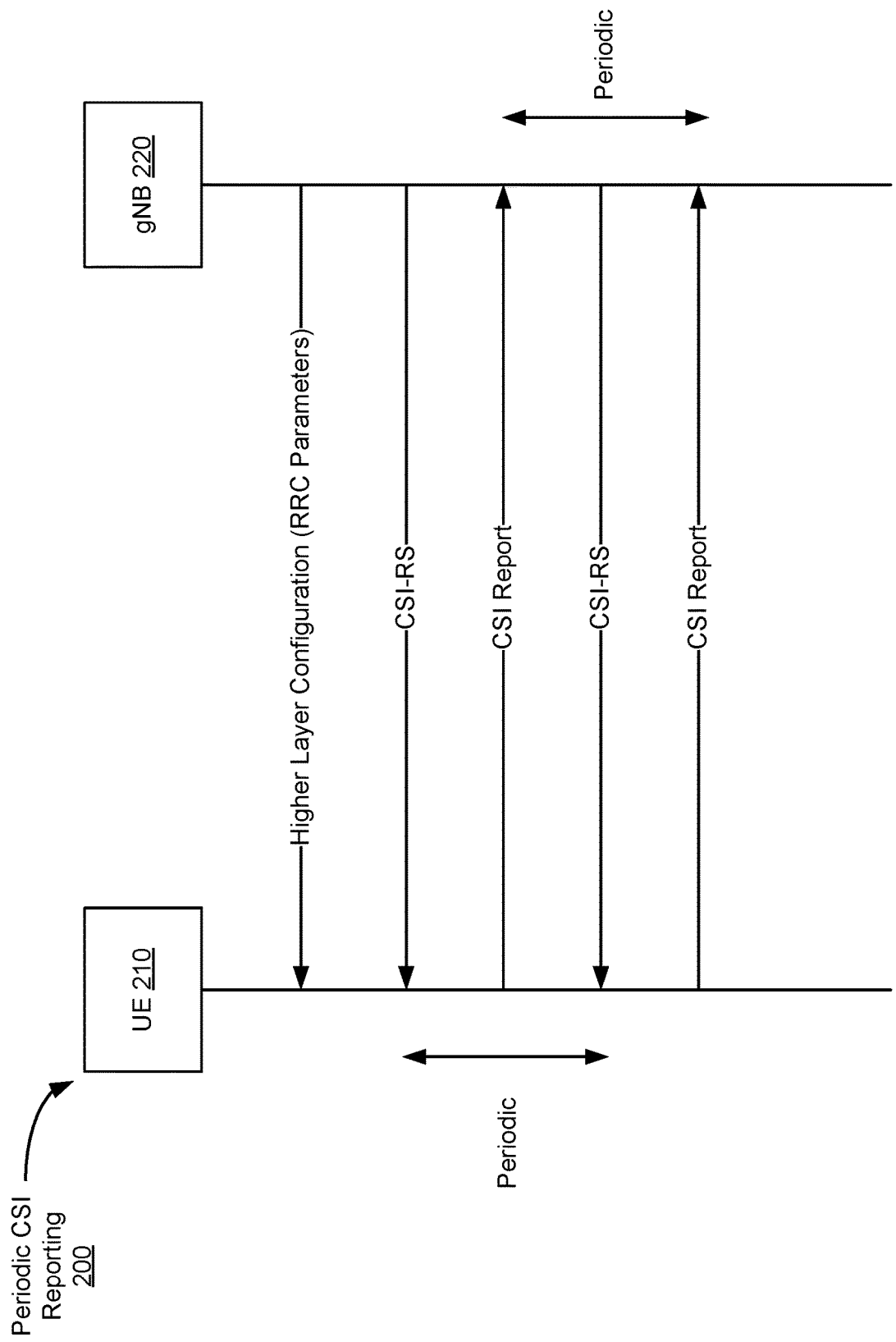
FIG. 2 illustrates examples of periodic channel state information (CSI) reporting, in accordance with some embodiments.

FIG. 2 illustrates an example of periodic CSI reporting 200, in accordance with some embodiments. Generally, a UE 210 is configured by a gNB 220 to periodically transmit CSI reports based on periodic transmissions of CSI-RS from the gNB 220. In the interest of clarity and brevity, CSI-RS that is transmitted periodically is referred to herein as a periodic CSI-RS (P-CSI-RS). Periodic reception of CSI-RS is also referred to as P-CSI-RS reception.

As illustrated in FIG. 2, the gNB 220 configures the UE 210 for P-CSI-RS reception via a higher layer configuration, such as by sending RRC parameters to the UE 210. The RRC parameters can be included in, for instance, a reportSlotConfig and identifying the periodicity of the CSI-RS. Generally, the RRC parameters include a first parameter associated with periodic reception by the UE 210 of CSI-RS, such as configuration information indicating to the UE 210 how to perform P-CSI-RS reception. For instance, the first parameter includes a CSI-RS validation indication, such as CSI-RS-ValidationWith-DCI-r16, In the case of a shared spectrum with other RATs, such as in the NR-U band, the RRC parameters can further indicate configuration information related to the shared spectrum. For instance, the RRC parameters include a second parameter indicating a channel occupancy (CO) duration for the P-CSI-RS and a third parameter indicating a slot associated with the reception of the P-CSI-RS. In an example, these two parameters include CO-DurationPerCell-r16 and SlotFormatIndicator, respectively.

Once the UE 210 is configured, no lower layer trigger may be needed to initiate an SCell activation procedure. Instead, the gNB 220 may periodically send CSI-RS to the UE 210 on the SCell. In turn, the UE 210 may periodically receive CSI-RS, and generate and send periodic CSI reports.

FIG. 3 illustrates examples of semi-persistent CSI reporting 300, in accordance with some embodiments. Generally, a UE 310 is configured by a gNB 320 to semi-persistently transmit CSI reports based on periodic transmissions of CSI-RS from the gNB 320. Semi-persistence refers to periodic transmissions and receptions upon an initial trigger (e.g., after the trigger, transmissions and receptions are periodically repeated without additional triggers). In the interest of clarity and brevity, CSI-RS that is transmitted semi-persistently is referred to herein as a semi-persistent CSI-RS (SP-CSI-RS). Semi-persistent reception of CSI-RS is also referred to as SP-CSI-RS reception.

As illustrated in FIG. 3, the gNB 320 configures the UE 310 for SP-CSI-RS reception via a higher layer configuration, such as by sending RRC parameters to the UE 310. The RRC parameters can be included in, for instance, a reportSlotConfig and identify the periodicity of the CSI-RS. Generally, the RRC parameters include a first parameter associated with semi-persistent reception by the UE 310 of CSI-RS, such as configuration information indicating to the UE 310 how to perform SP-CSI-RS reception. For instance, the first parameter includes CSI-RS-ValidationWith-DCI-r16. In the case of a shared spectrum with other RATs, such as in the NR-U band, the RRC parameters can further indicate configuration information related to the shared spectrum. For instance, the RRC parameters include a second parameter indicating a CO duration for the SP-CSI-RS and a third parameter indicating a slot associated with the reception of the SP-CSI-RS. In an example, these two parameters include CO-DurationPerCell-r16 and SlotFormatIndicator, respectively.

Once the UE 310 is configured, a lower layer trigger, such as a media access control (MAC) control element (CE) is sent from the gNB 320 to the UE 310 to initiate an SCell activation procedure. Thereafter, no additional triggers may be needed. Instead, the gNB 320 may periodically send CSI-RS to the UE 310 on the SCell. In turn, the UE 310 may periodically receive CSI-RS, and generate and send periodic CSI reports.

FIG. 4 illustrates an example of aperiodic CSI 400 reporting, in accordance with some embodiments. Generally, a UE 410 is configured by a gNB 420 to transmit CSI reports based on aperiodic transmissions of CSI-RS from the gNB 420. A lower layer trigger may be used before each aperiodic transmission of CSI-RS from the base station 420 followed by the CSI report of the UE 410. In the interest of clarity and brevity, CSI-RS that is transmitted on an aperiodic basis is referred to herein as an aperiodic CSI-RS (AP-CSI-RS). Aperiodic reception of CSI-RS is also referred to as AP-CSI-RS reception.

As illustrated in FIG. 4, the gNB 420 configures the UE 410 for AP-CSI-RS reception via a higher layer configuration, such as by sending RRC parameters to the UE 410. The RRC parameters can be included in, for instance, a reportSlotOffsetList and can indicate a first timing offset (or a slot offset) between a lower layer trigger and aperiodic CSI-RS transmission (e.g., between the second and third arrows in FIG. 4) and a second timing offset (or a slot offset) between the lower layer trigger and aperiodic transmission of a CSI report (e.g., between the second and fourth arrow in FIG. 4). In the case of a shared spectrum with other RATs, such as in the NR-U band, the RRC parameters need not include CSI-RS-ValidationWith-DCI-r16, CO-DurationPerCell-r16 or SlotFormatIndicator.

Once the UE 410 is configured, a lower layer trigger, such as a MAC CE or a DCI is sent from the gNB 420 to the UE 410 to initiate an SCell activation procedure. Based on the first timing offset, the gNB 420 may transmit an AP-CSI-RS to the UE 410 on the SCell. Based on the second timing offset, the UE 410 may send periodic a CSI report. If additional CSI reports are needed, AP-CSI-RS transmission and CSI report transmission can be repeated following another lower layer trigger.

Figure 5:
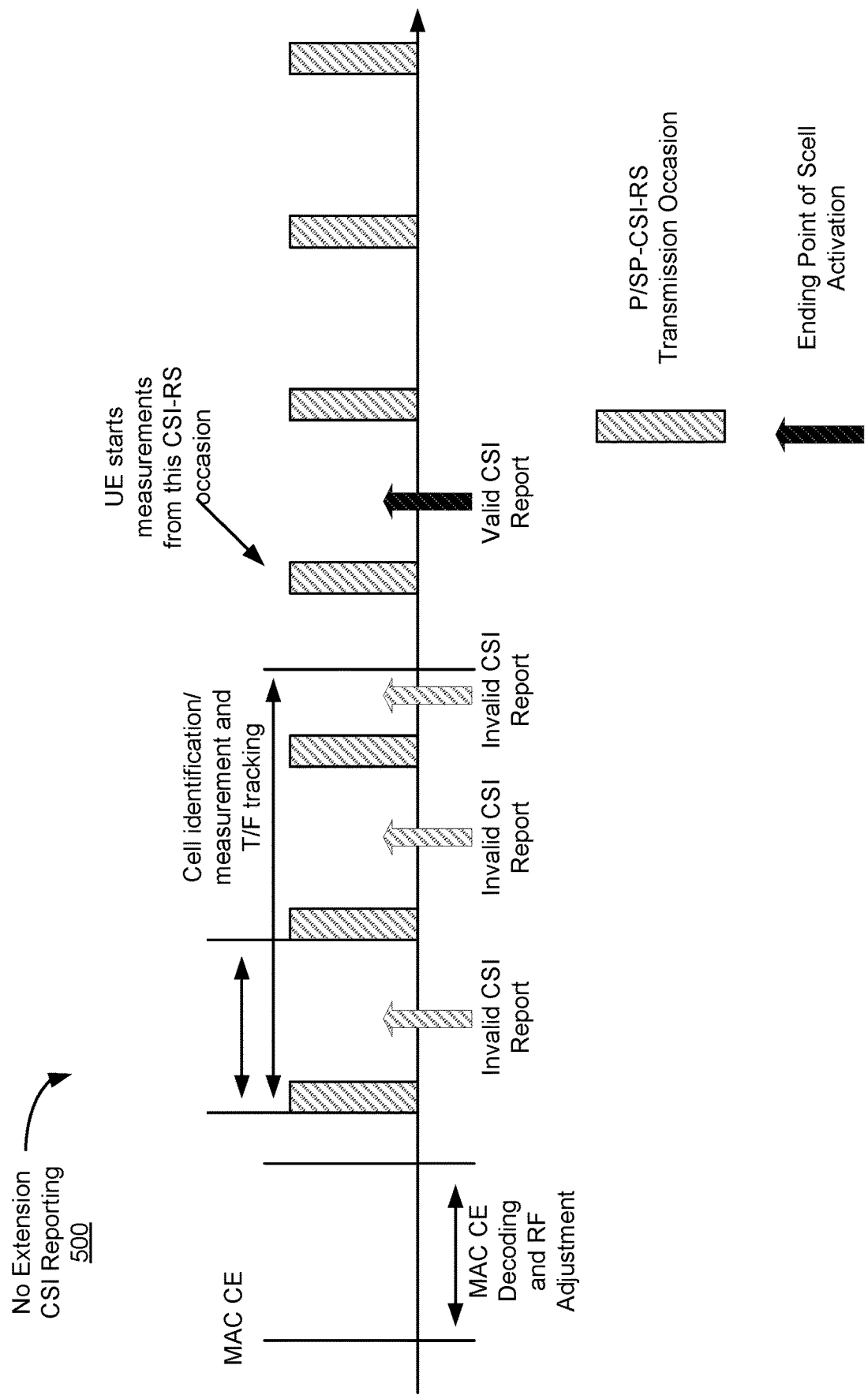
FIG. 5 illustrates an example of transmitting a valid CSI report during an SCell activation procedure, in accordance with some embodiments.

FIG. 5 illustrates an example of transmitting a valid CSI report during an SCell activation procedure, in accordance with some embodiments. In the illustration of FIG. 5, no extension CSI reporting 500 is performed, whereby a UE sends a valid CSI report without canceling a CSI-RS reception or any additional delay beyond the time needed to receive and process a CSI-RS. An SCell activation procedure can start from the timing when the UE receives a MAC CE command of SCell activation and end at the timing when the UE reports, to the network (e.g., to a gNB), a valid CSI for the target being-activated SCell.

As illustrated, the UE receives a MAC CE to activate an SCell, where the MAC CE can identify the SCell. A first time interval may be needed for the UE to decode the MAC CE and adjusts its radio frequency (RF) reception chain to enable reception and processing of CSI-RS on the SCell. A second time may be needed for the UE to adjust its baseband chain, identify the SCell, and perform time/frequency tracking such that CSI-RS can be received and processed to generate a CSI report. After the first time interval and before the second time interval, the network may send multiple CSI-RSs and, in response, the UE may respond with an invalid CSI report (e.g., a report with the channel quality indicator (CQI) set to zero). Only after the second time interval, the UE may receive a CSI-RS, perform the relevant measurements, and generate and send a valid CSI report. The illustrated transmission is periodic, where the time interval between two CSI-RSs is the CSI-RS periodicity. When the trigger is a MAC CE, an SP-CSI-RS is used, similar to the illustration of FIG. 3. When no MAC CE is triggered, a P-CSI-RS is used, similar to the illustration of FIG. 3. For AP-CSI-RS, the network (e.g. gNB) may transmit an AP-CSI-RS after the end of the second time interval.

Generally, the UE receives a CSI-RS in a set of symbols within a frame (e.g., within a set of slots of a sub-frame of the frame) of a downlink channel of the SCell. A CSI-RS resource may start at any OFDM symbol of a slot and it usually occupies one, two, or four OFDM symbols depending upon a configured number of ports. For time/frequency tracking, CSI-RS can either be periodic or aperiodic. It is transmitted in bursts of two or four symbols which can be spread across one or two slots.

Figure 6:
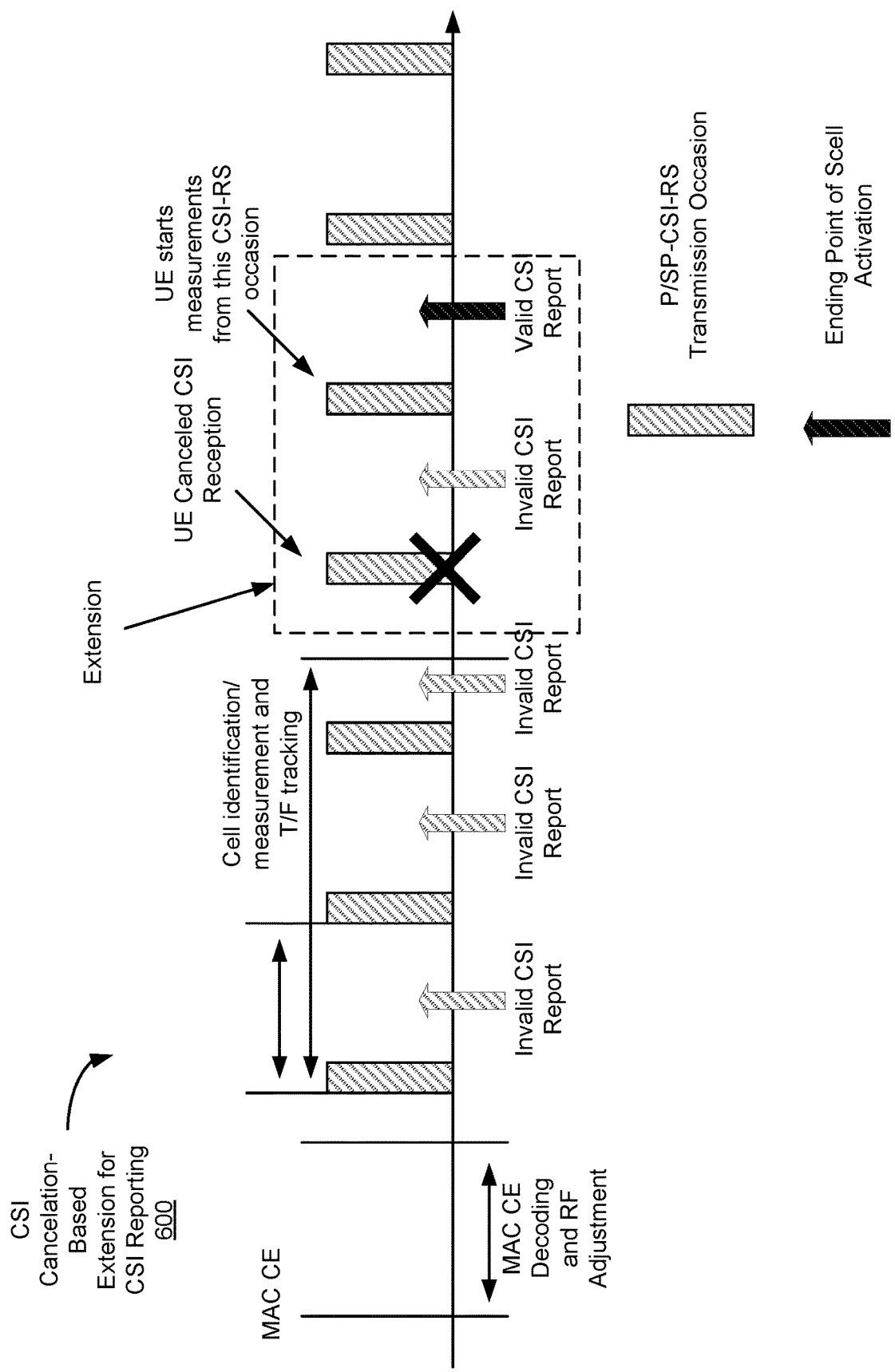
FIG. 6 illustrates an example of extending a duration of an SCell activation procedure based on canceled CSI-reference signal (RS) reception, in accordance with some embodiments.

FIG. 6 illustrates an example of extending a duration of an SCell activation procedure based on canceled CSI-reference signal (RS) reception, in accordance with some embodiments. In the illustration of FIG. 6, a CSI cancelation-based extension for CSI reporting 600 is used, whereby a UE can extend a duration of an SCell activation procedure prior to sending a valid CSI report, if any.

Similar to the illustration of FIG. 5, an SCell activation procedure can start from the timing when the UE receives a MAC CE command of SCell activation (e.g., in the case of SP-CSI-RS, or automatically in the case of a P-CSI-RS). The first and second time intervals may also be needed before the UE is capable of sending a valid CSI report. Any CSI-RS transmitted during the second time interval may result in the UE sending an invalid CSI report. However, unlike the illustration of FIG. 5, the UE can cancel CSI-RS reception (P-CSI-RS reception or SP-CSI-RS reception) and, upon such a cancelation, extend the duration of the SCell activation procedure up to a maximum extension. The time interval that defines the duration can depend on the number (X) of the canceled CSI-RS receptions (also referred to as a number of canceled CSI-RS occasions) and the CSI-RS periodicity, where this number (X) is bounded by an upper limit ($X_{max}$).

As illustrated, the UE receives a MAC CE to activate an SCell, where the MAC CE can identify the SCell (e.g., in the case of SP-CSI-RS, no MAC CE may be needed in the case of a P-CSI-RS). After the second time interval, a CSI-RS may be transmitted, where the CSI-RS represents a CSI-RS transmission occasion that can be received by the UE to generate and send a valid CSI report. However, due to particular conditions, the UE may cancel the reception of the CSI-RS (as indicated with an x-mark in FIG. 6). Instead, the UE may generate and send an invalid report. Upon canceling the CSI-RS reception, the UE can extend the duration of the SCell activation procedure by a time interval (illustrated with a dashed rectangle in FIG. 6). The length of the time interval can depend on many factors, such as the number (e.g., how many times) of canceled CSI-RS reception (e.g., one in the illustration of FIG. 6) and the CSI-periodicity, in addition to processing times and delays related to CSI-RS processing. The upper bound on the time interval can be set based on a maximum number of allowed CSI-RS reception cancelation and the CSI-RS periodicity. The condition can change such that, during the time interval, the UE can receive a CSI-RS, perform the relevant measurements, and generate and send a valid CSI report. Otherwise, the extended duration expires, no valid CSI report is sent, and the SCell activation procedure can be canceled.

Canceling a CSI-RS reception can include powering off or deactivating the RF reception chain of the UE, such that a transmitted CSI-RS is not received by the UE. Additionally or alternatively, canceling the CSI-RS reception can include powering off or deactivating baseband processor of the UE such that a received CSI-RS may not be processed.

In an example, the conditions can include the UE being configured for periodic/semi-persistent reception of CSI-RS, but the configuration information sent to the UE being insufficient to perform the periodic/semi-persistent reception and/or amounting to an aperiodic reception configuration. For instance, in the case of NR-U where the frequency spectrum is shared between multiple RATs, 3GPP TS38.213 V16.3.0 (2020-10-02) specifies that "[f] or operation with shared spectrum channel access, if a UE is provided CSI-RS-ValidationWith-DCI-r16, is not provided CO-DurationPerCell-r16, and is not provided SlotFormatCombinationsPerCell, and if the UE is configured by higher layers to receive a CSI-RS in a set of symbols of a slot, the UE cancels the CSI-RS reception in the set of symbols of the slot if the UE does not detect a DCI format indicating an aperiodic CSI-RS reception or scheduling a PDSCH reception in the set of symbols of the slot." In other words, the UE cancels the CSI-RS if it is configured for periodic or semi-persistent CSI-RS reception (per the CSI-RS-ValidationWith-DCI-r16 parameter or other means), but does not have sufficient information for this type of reception in the case of an NR-U shared band because the channel occupancy and/or slot information are missing (e.g., has not received the CO-DurationPerCell-r16, and SlotFormatCombinationsPerCell parameters), DCI for AP-CSI-RS reception is not received, or scheduling information of PDSCH in the set of symbols is not received. Given these conditions, the target being-activated SCell is deactivated before the UE completes the SCell activation procedure, unless the duration of the SCell activation procedure is extended per FIG. 6. For instance, the UE cancels the CSI-RS reception if it is configured for periodic or semi-persistent CSI-RS reception, if it is provided the CSI-RS-ValidationWith-DCI-r16 parameter but not the CO-DurationPerCell-r16 and SlotFormatCombinationsPerCell parameters, or if it is not provided with any of these parameters.

By extending the duration, an opportunity is provided to avoid further CSI-RS cancelations and successfully activate the SCell. For instance, the UE can receive missing RRC parameters (e.g., CO-DurationPerCell-r16, and SlotFormatCombinationsPerCell), DCI indicating an aperiodic CSI-RS reception, and/or scheduling information of the PDSCH in the set of symbols. If any of these receptions occur, the UE can receive and process a next CSI-RS during the extended duration to then send a valid CSI report.

Figure 7:
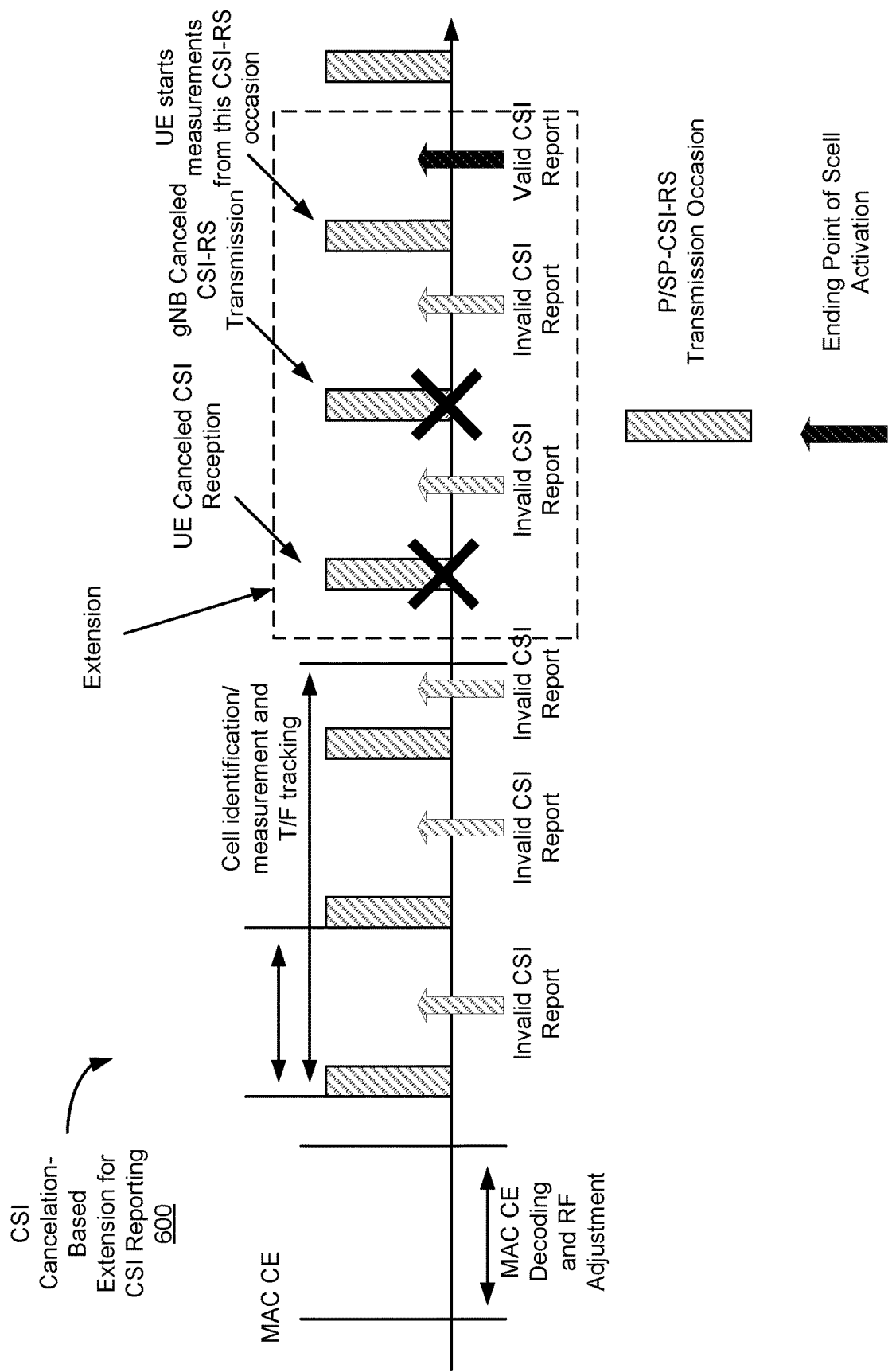
FIG. 7 illustrates an example of extending a duration of an SCell activation procedure based on canceled CSI-RS reception and listen-before-talk (LBT) canceled CSI-RS transmission, in accordance with some embodiments.

FIG. 7 illustrates an example of extending a duration of an SCell activation procedure based on canceled CSI-RS reception and listen-before-talk (LBT) canceled CSI-RS transmission, in accordance with some embodiments. Like the duration extension in FIG. 6, a UE can extend the duration of an SCell activation based on the number of times CSI-RS reception is canceled and the CSI-RS periodicity, among other factors. Additionally, here the network (e.g., the gNB) may cancel a CSI-RS transmission due to an LBT procedure used in the NR-U frequency band. The duration can be extended to also account for the number (L4) of canceled CSI-RS transmissions (also referred to as a number of unavailable CSI-RS occasions) and the CSI-RS periodicity. For instance, this additional extension is based on the number (L4) multiplied by the CSI-RS periodicity and can have an upper bound. The upper bound can be based on a predefined maximum number (L4,max) multiplied by the CSI-RS periodicity.

As illustrated, after the end of the second time interval, the UE cancels one CSI-RS reception. The network also cancels one CSI-RS transmission. Accordingly, the duration of the SCell activation procedure is extended to account for both the canceled CSI-RS reception and the canceled CSI-transmission. The UE may receive the missing RRC parameters (e.g., CO-DurationPerCell-r16, and SlotFormatCombinationsPerCell), DCI indicating an aperiodic CSI-RS reception, and/or scheduling information of the PDSCH in the set of symbols. If any of these receptions occur, the UE can receive and process a next CSI-RS during the extended duration to then send a valid CSI report.

Referring back to FIGS. 6 and 7, the number of canceled CSI-RS occasions and the number of unavailable CSI-RS occasions can be jointly or separately used to extend an SCell activation procedure. In particular, during the SCell activation procedure, if the UE is provided CSI-RS-ValidationWith-DCI-r16, is not provided CO-DurationPerCell-r16, and is not provided SlotFormatIndicator, and if the UE is configured by higher layers to receive a P-CSI-RS or SP-CSI-RS in a set of symbols of a slot for CSI reporting for SCell activation, the UE cancels this CSI-RS reception in the set of symbols of the slot for SCell activation, and the UE extends SCell activation procedure by at least $X*T_{CSI\text{-}RS}$. X is the number of CSI-RS occasions canceled by the UE. The UE extends the SCell activation procedure up to $X_{max}*T_{CSI\text{-}RS}$, where $X \leq X_{max}$. If the cancelled CSI-RS occasions exceeds $X_{max}$, the UE abandons the SCell activation procedure.

In one example, the CSI reporting procedure delay for SCell activation in NR-U (e.g., the time interval of the extended duration, expressed as $T_{CSI_{reporting with CCA}}$) can be defined as $T_{CSI_{reporting with CCA}} = T_{CSI_{reporting}} + L4*T_{CSI\text{-}RS} + X*T_{CSI\text{-}RS} + T_{CSI_{Reporting Delay}}$, where $T_{CSI_{reporting with CCA}}$ is the delay (in milliseconds) including uncertainty in acquiring the first available downlink CSI reference resource, UE processing time for CSI reporting and uncertainty in acquiring the first available CSI reporting resources as specified in, for instance, 3GPP TS 38.331 V16.20, (2020-09), and additional delay in reception of CSI-RS due to unavailability of reference signal CCA and additional delay in transmission of CSI reporting due to CCA failure in uplink (UL); $T_{CSI_{reporting}}$ is the delay (in milliseconds) including uncertainty in acquiring the first available downlink CSI reference resource, UE processing time for CSI reporting and uncertainty in acquiring the first available CSI reporting resources as specified in 3GPP TS 38.331 V16.2.0, (2020-09); $T_{CSI\text{-}RS}$ is the CSI-RS periodicity; $T_{CSI_{Reporting Delay}}$ is an additional delay in transmission of CSI reporting due to clear channel assessment (CCA) failure in uplink; L4 is the number of occasions the CSI-RS is not available (e.g., the number of unavailable CSI-RS occasions); L4≤L4, max; L4,max=2 if $T_{CSI\text{-}RS} \leq 40$ ms, and L4, max=1 otherwise; X is the number of occasion UE canceled P-CSI-RS or SP-CSI-RS from reception (e.g., the number of canceled CSI-RS occasions) if UE is provided CSI-RS-ValidationWith-DCI-r16, is not provided CO-DurationPerCell-r16, is not provided SlotFormatIndicator, and if the UE is configured by higher layers to receive a P-CSI-RS or SP-CSI-RS in a set of symbols of a slot for CSI reporting for SCell activation; $X \leq X_{max}$; and $X_{max}$ can also be differentiated among different $T_{CSI\text{-}RS}$.

In another example, the CSI reporting procedure delay for SCell activation in NR-U (e.g., the time interval of the extended duration, expressed as $T_{CSI_{reporting with CCA}}$) can be defined as $T_{CSI_{reporting with CCA}} = T_{CSI_{reporting}} + L4*T_{CSI\text{-}RS} + T_{CSI_{Reporting Delay}}$, where $T_{CSI_{reporting with CCA}}$ is the delay (in milliseconds) including uncertainty in acquiring the first available downlink CSI reference resource, UE processing time for CSI reporting and uncertainty in acquiring the first available CSI reporting resources as specified in, for instance, 3GPP TS 38.331 V16.20, (2020-09), and additional delay in reception of CSI-RS due to unavailability of reference signal CCA and additional delay in transmission of CSI reporting due to CCA failure in uplink (UL); $T_{CSI_{reporting}}$ is the delay (in milliseconds) including uncertainty in acquiring the first available downlink CSI reference resource, UE processing time for CSI reporting and uncertainty in acquiring the first available CSI reporting resources as specified in 3GPP TS 38.331 V16.20, (2020-09); $T_{CSI\text{-}RS}$ is the CSI-RS periodicity; $T_{CSI_{Reporting Delay}}$ is an additional delay in transmission of CSI reporting due to clear channel assessment (CCA) failure in uplink; L4 is the number of occasions the CSI-RS is not available (e.g., the number of unavailable CSI-RS occasions) and the occasions UE canceled P-CSI-RS or SP-CSI-RS from reception (e.g., the number of canceled CSI-RS occasions) if UE is provided CSI-RS-ValidationWith-DCI-r16, is not provided CO-DurationPerCell-r16, is not provided SlotFormatIndicator, and if the UE is configured by higher layers to receive a P-CSI-RS or SP-CSI-RS in a set of symbols of a slot for CSI reporting for SCell activation; L4≤L4, max; L4, max=n1 if $T_{CSI\text{-}RS} \leq 40$ ms, and L4, max=n2 otherwise; n1 and n2 are positive integers.

Figure 8:
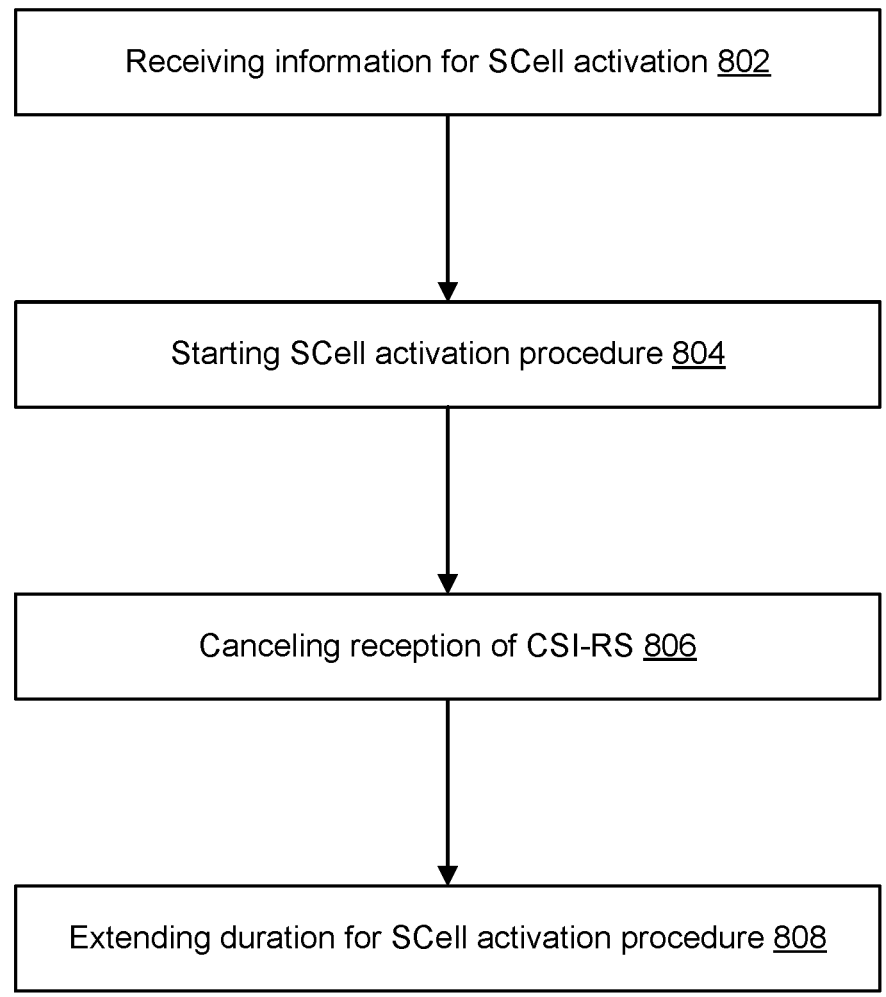
FIG. 8 illustrates an example of an operational flow/algorithmic structure for extending a duration of an SCell activation procedure, in accordance with some embodiments.

FIG. 8 illustrates an example of an operational flow/algorithmic structure 800 for extending a duration of an SCell activation procedure, in accordance with some embodiments. A UE can implement the operational flow/algorithmic structure 800 to extend a duration of an SCell activation procedure, where this procedure can be successful upon a transmission of a valid CSI report or can be canceled upon an expiration of the extended duration. The operation flow/algorithmic structure 800 may be performed or implemented by the UE such as, for example, the UE 104, 1500, or components thereof, for example, processors 1504.

The operation flow/algorithmic structure 800 may include, at 802, receiving, from a base station, information for a secondary cell (SCell) activation. In some embodiments, the information can include RRC parameters for a periodic CSI-RS reception that can trigger periodic CSI reporting. In some embodiments, the information includes a MAC CE to trigger semi-persistent CSI reporting.

The operation flow/algorithmic structure 800 may further include, at 804, starting, based on the information, an SCell activation procedure. In some embodiments, in the case of periodic CSI reporting, the SCell activation procedure may automatically start upon a determination, from the information, of a set of symbols in a slot where a P-CSI-RS signal is expected. In some embodiments, in the case of semi-persistent CSI reporting, the SCell activation procedure may start upon a receipt of a MAC CE element indicating a command for the SCell activation.

The operation flow/algorithmic structure 800 may further include, at 806, canceling reception of a CSI-RS sent by the base station, where the CSI-RS is associated with generating a CSI report by the UE for the SCell activation. In some embodiments, the CSI-RS reception is canceled based on a set of conditions. For instance, in the case of shared spectrum access using NR-U, if the UE is provided CSI-RS-ValidationWith-DCI-r16, is not provided CO-DurationPerCell-r16, is not provided SlotFormatCombinationsPerCell, and if the UE is configured by higher layers to receive a CSI-RS in a set of symbols of a slot, the UE cancels the CSI-RS reception in the set of symbols of the slot if the UE does not detect a DCI format indicating an aperiodic CSI-RS reception or scheduling a PDSCH reception in the set of symbols of the slot.

The operation flow/algorithmic structure 800 may further include, at 808, extending, based on said canceling reception of the CSI-RS, a duration of the SCell activation procedure. In some embodiments, the duration can be extended by a time interval to account for the number of canceled CSI-RS occasions. If the base station also cancels CSI-RS transmissions, the time interval can also account for the number of unavailable CSI-RS occasions. A specific time interval $T_{CSI_{reportingwithCCA}}$ can be computed using any of the above example equations.

Figure 9:
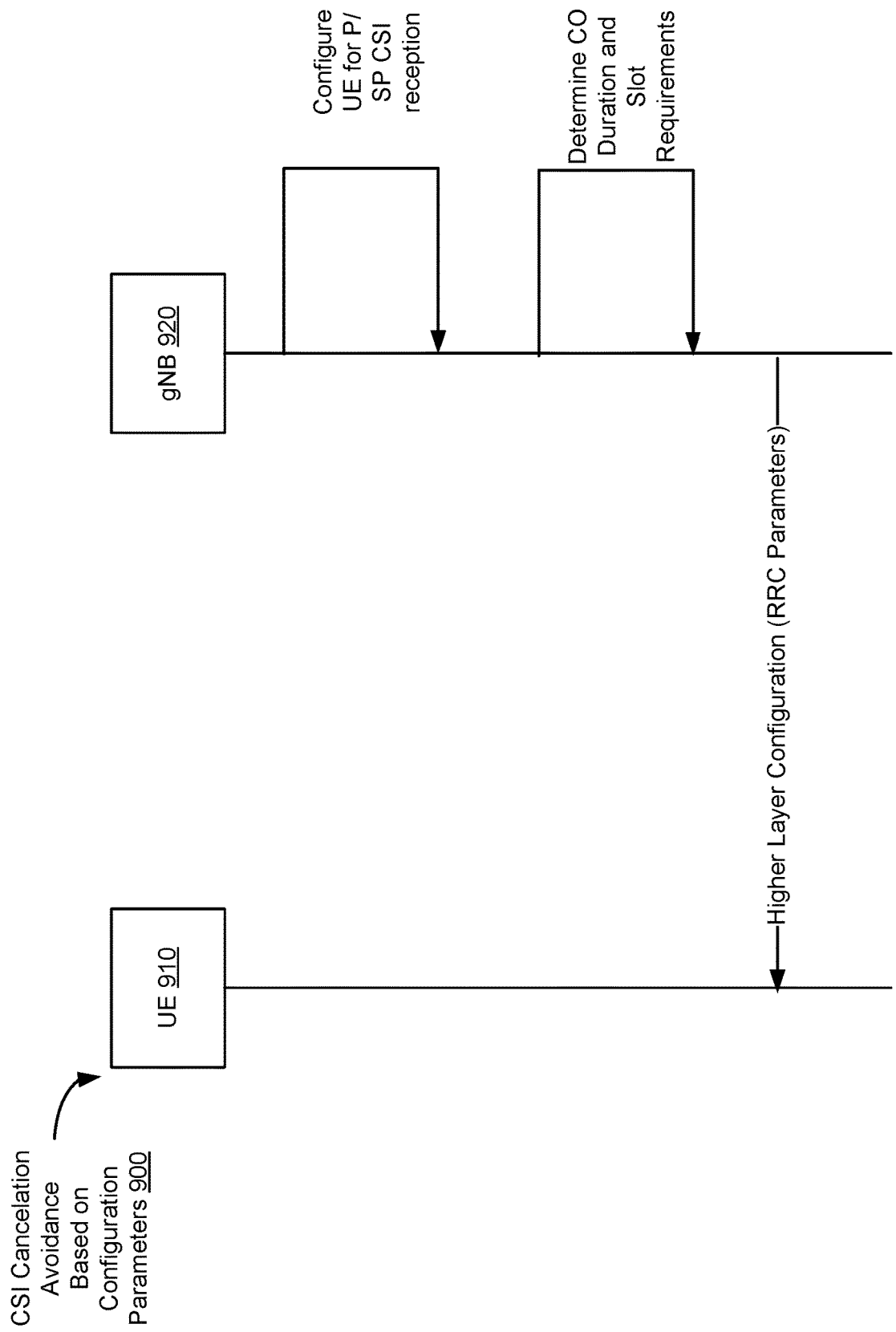
FIG. 9 illustrates an example of signaling between a base station and a user equipment (UE) for configuring the UE to avoid cancelation of CSI-RS reception, in accordance with some embodiments.

FIG. 9 illustrates an example of signaling between a base station and UE for configuring the UE to avoid cancelation of CSI-RS reception, in accordance with some embodiments. The signaling relates to CSI cancelation avoidance based on configuration parameters 900. Generally, the base station (or, more generally, a network) can initially configure the UE for periodic or semi-persistent CSI reporting. However, given certain conditions, the UE can cancel P-CSI-RS reception or SP-CSI-reception. The base station can determine and send all necessary configuration information that mitigates the conditions, avoids the cancelation and, requires the SCell activation. If this necessary configuration information is not provided to the UE, there would be no requirement for SCell activation, which means that the UE's behavior can be unpredictable, and the base station may not expect the UE to conduct the SCell activation.

In an example of shared spectrum access using the NR-U, the base station (or, more generally, the network) configures the UE to receive P-CSI-RS or SP-CSI-RS in a set of symbols of a slot for CSI reporting for SCell activation. For instance, the base station sets the CSI-RS-ValidationWith-DCI-r16 parameter. The base station determines a requirement (e.g., as defined in data stored in memory and used in executable logic of the base station, where the definition corresponds to a technical specification (TS)) to avoid configuring the P-CSI-RS reception or SP-CSI-RS reception with other RRC parameters indicating the channel occupancy or slot information. As such, the base station also sets the CO-DurationPerCell-r16 and SlotFormatIndicator parameters for the UE. The three parameters are signaled to the UE via a higher layer configuration (e.g., in a same RRC message or in separate RRC messages).

Figure 10:
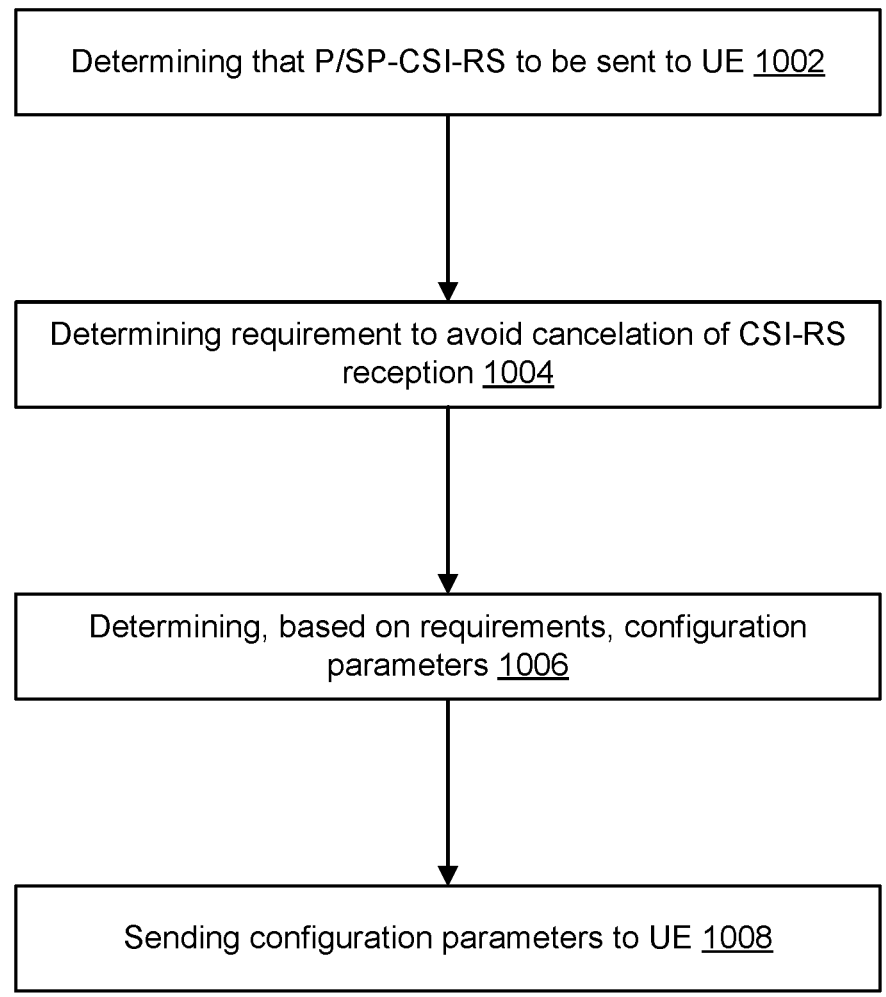
FIG. 10 illustrates an example of an operational flow/algorithmic structure for configuring a UE to avoid cancelation of CSI-RS reception, in accordance with some embodiments.

FIG. 10 illustrates an example of an operational flow/algorithmic structure 1000 for configuring a user equipment (UE) to avoid cancelation of CSI-RS reception, in accordance with some embodiments. A base station can implement the operational flow/algorithmic structure 1000 to avoid, for instance, cancelation of P-CSI-RS reception or SP-CSI-RS reception by a UE. The operation flow/algorithmic structure 1000 may be performed or implemented by the base station such as, for example, the gNB 108, 1600, or components thereof, for example, processors 1604.

The operation flow/algorithmic structure 1000 may include, at 1002, determining that a CSI-RS is to be sent to the UE for CSI reporting by the UE during an activation of an SCell. The SCell has a frequency band shared between multiple RATs. The CSI-RS is at least one of a periodic CSI-RS (P-CSI-RS) or a semi-persistent CSI-RS (SP-CSI-RS).

The operation flow/algorithmic structure 1000 may further include, at 1004, determining a requirement to avoid a cancelation of CSI-RS reception by the UE. The requirement indicates a plurality of configuration parameters to send to the UE. In some embodiments, the requirement indicates that if periodic or semi-persistent CSI reporting is configured (e.g., via the CSI-RS-ValidationWith-DCI-r16 parameter), the base station needs to also configure parameters related to channel occupancy and slot information (e.g., the CO-DurationPerCell-r16 and SlotFormatIndicator parameters).

The operation flow/algorithmic structure 1000 may further include, at 1006, determining, based on the requirement, the plurality of configuration parameters including a first parameter associated with periodic or semi-persistent reception of the CSI-RS, a second parameter indicating a channel occupancy duration for the CSI-RS, and a third parameter indicating a slot associated with the CSI-RS reception. In some embodiments, the first parameter includes CSI-RS-ValidationWith-DCI-r16, the second parameter includes CO-DurationPerCell-r16, and the third parameter includes SlotFormatIndicator.

The operation flow/algorithmic structure 1000 may further include, at 1008, sending the plurality of configuration parameters to the UE. In some embodiments, higher layer signaling is used, such as one or more RRC messages are sent to the UE and include(s) the CSI-RS-ValidationWith-DCI-r16, the CO-DurationPerCell-r16, and the SlotFormatIndicator parameters.

Figure 11:
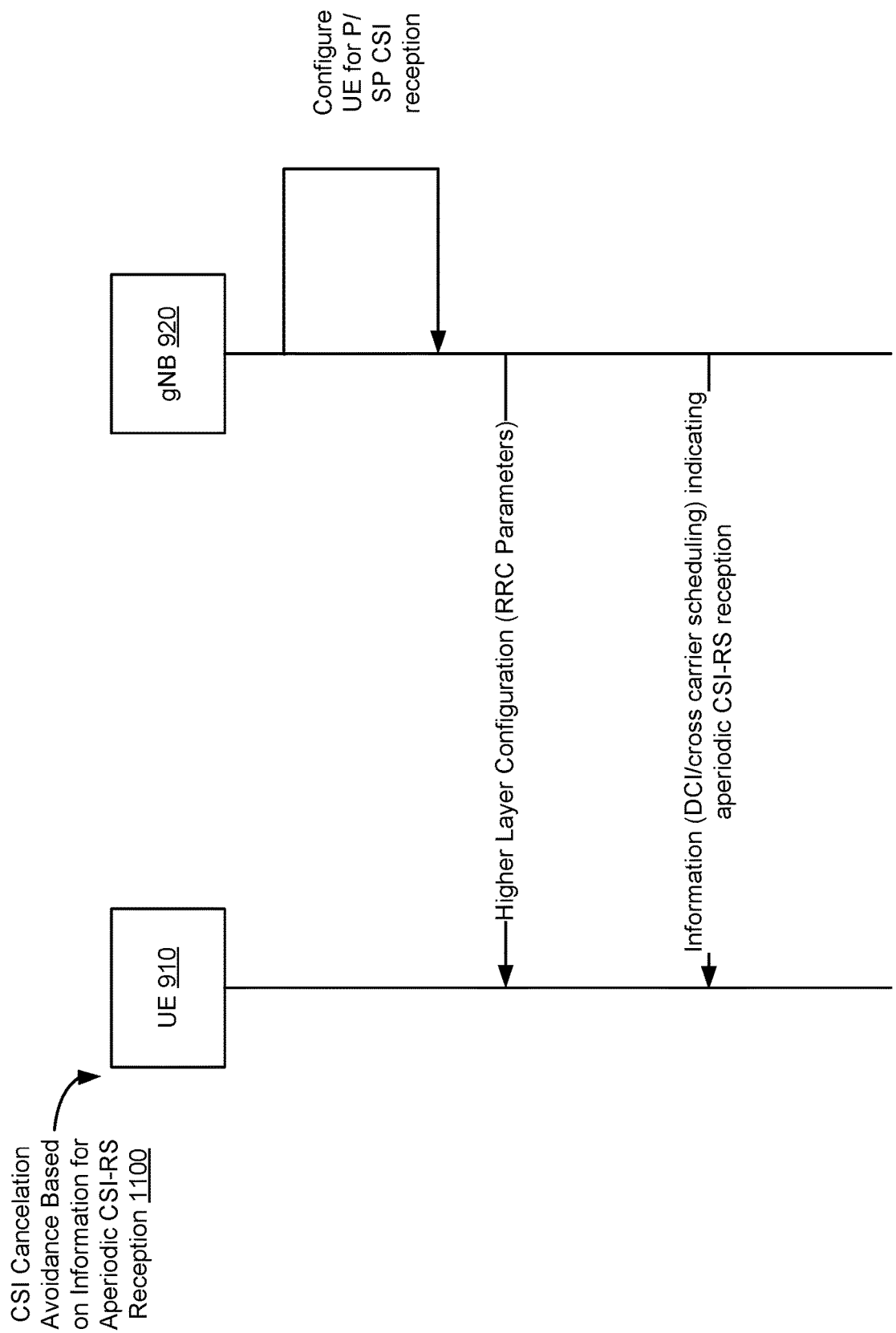
FIG. 11 illustrates an example of signaling between a base station and a UE for configuring the UE with periodic or semi-persistent CSI-RS reception and subsequently indicating an aperiodic CSI-RS reception to avoid cancelation of CSI-RS reception, in accordance with some embodiments.

FIG. 11 illustrates an example of signaling between a base station and a UE for configuring the UE with periodic or semi-persistent CSI-RS reception and subsequently indicating an aperiodic CSI-RS reception to avoid cancelation of CSI-RS reception, in accordance with some embodiments. The signaling relates to CSI cancelation avoidance based on information for aperiodic CSI-RS reception 1100. Generally, the base station (or, more generally, a network) can initially configure the UE for periodic or semi-persistent CSI reporting, but may not provide all necessary configuration information to the UE to avoid canceling P-CSI-RS reception or SP-CSI-RS reception. For instance, the base station can provide, to the UE, CSI-RS-ValidationWith-DCI-r16 but not CO-DurationPerCell-r16 and SlotFormatIndicator. Alternatively or additionally, the base station can configure the UE for P-CSI-RS reception or SP-CSI-RS reception, but may subsequently dynamically change the CSI reporting to be aperiodic. For instance, the base station can provide, to the UE, CSI-RS-ValidationWith-DCI-r16 but not CO-DurationPerCell-r16 and SlotFormatIndicator. In both cases, subsequent to the configuration, the base station can send information related to aperiodic CSI-RS reception, where this information allows the UE to determine the set of symbols for the aperiodic CSI reception to then perform the relevant measurements and send an aperiodic CSI report. Hence, although the SCell activation procedure may be initially set up for periodic or semi-persistent CSI reporting, the base station can dynamically change the set-up to aperiodic CSI reporting by sending the information. The information can be sent in DCI or in cross-carrier scheduling information.

In an example, for an operation with shared spectrum channel access using NR-U, if a UE is provided CSI-RS-ValidationWith-DCI-r16, is not provided CO-DurationPerCell-r16, is not provided SlotFormatIndicator, and if the UE is configured by higher layers to receive a CSI-RS in a set of symbols of a slot, if a base station (or, more generally, a network) does not want UE to cancel the CSI-RS reception in the set of symbols of the slot on the target being-activated SCell, the base station can use DCI format indicating an aperiodic CSI-RS reception on the target being-activated SCell. Alternatively or additionally, the network can use a cross-carrier scheduling command to indicate the availability of a set of symbols of the slot on the target being-activated SCell.

After the UE received the above configurations, the UE needs to interpret the intention from the base station. If the base station uses DCI format indicating an aperiodic CSI-RS reception on the target being-activated SCell, the UE interprets that the P-CSI-RS or SP-CSI-RS for CSI reporting on the target being-activated SCell is available on those indicated aperiodic CSI-RS symbols. If the base station uses a cross-carrier scheduling command to indicate the availability of a set of symbols of the slot on the target being-activated SCell, the UE interprets that the P-CSI-RS or SP-CSI-RS for CSI reporting on the target being-activated SCell is available on those indicated PDSCH symbols.

As illustrated in FIG. 11, the base station can initially configure, via higher layer signaling, the UE for P-CSI-RS reception or SP-CSI-RS reception. For instance, the base station can send an RRC message that include the CSI-RS-ValidationWith-DCI-r16 parameter. Subsequently, the UE can send the information indicating the aperiodic CSI-RS reception. If DCI is used, the specific DCI format can indicate a cell index of the SCell that is being activated. This cell index, another field in the DCI, or some other data structure can indicate to the UE that the SCell is being activated rather than being a serving cell. If the cross-carrier scheduling information is used, this information can also indicate that the SCell is being activated, rather than being a serving cell, in addition to the specific symbols on the PDSCH to use for the aperiodic CSI-RS reception.

Figure 12:
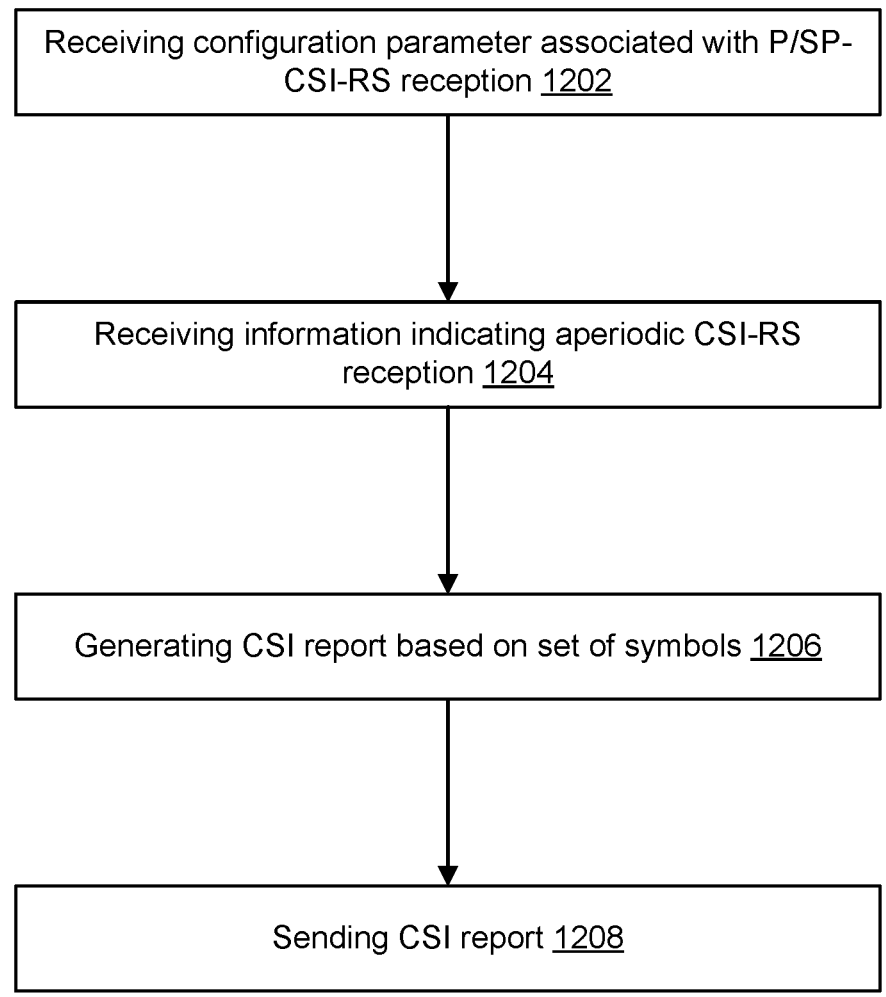
FIG. 12 illustrates an example of an operational flow/algorithmic structure for a UE configured with periodic or semi-persistent CSI-RS reception to process information indicating an aperiodic CSI-RS reception, in accordance with some embodiments.

FIG. 12 illustrates an example of an operational flow/algorithmic structure 1200 for a UE configured with periodic or semi-persistent CSI-RS reception to process information indicating an aperiodic CSI-RS reception, in accordance with some embodiments. A UE can implement the operational flow/algorithmic structure 1200 to send an aperiodic CSI report even when configured for periodic or semi-persistent CSI reporting. The operation flow/algorithmic structure 1200 may be performed or implemented by the UE such as, for example, the UE 104, 1500, or components thereof, for example, processors 1504.

The operation flow/algorithmic structure 1200 may include, at 1202, receiving, from a base station, a configuration parameter associated with periodic or semi-persistent reception of a CSI-RS by the UE. The CSI-RS is associated with generating a CSI report by the UE for an SCell activation. In some embodiments, the UE may receive, from the base station, the CSI-RS-ValidationWith-DCI-r16 parameter but not the CO-DurationPerCell-r16, nor the SlotFormatIndicator parameters.

The operation flow/algorithmic structure 1200 may further include, at 1204, receiving, from the base station, information indicating an aperiodic reception of the CSI-RS in a set of symbols in a slot of an SCell that is being activated. In some embodiments, DCI is received, where the DCI indicates that the SCell is being activated (rather than being a serving cell) and can be processed to identify the set of symbols on a PDSCH of the SCell. In some other embodiments, cross-carrier scheduling information may be received and may indicate the set of symbols on the PDSCH. The CSI-RS can be sent on an aperiodic basis in the set of symbols.

The operation flow/algorithmic structure 1200 may further include, at 1206, generating the CSI report based on the set of symbols. In some embodiments, the UE receives the aperiodic CSI-RS in the set of symbols, performs the relevant measurements, and generates a valid CSI report.

The operation flow/algorithmic structure 1200 may further include, at 1208, sending the CSI report to the base station. In some embodiments, the CSI report is aperiodic.

Figure 13:
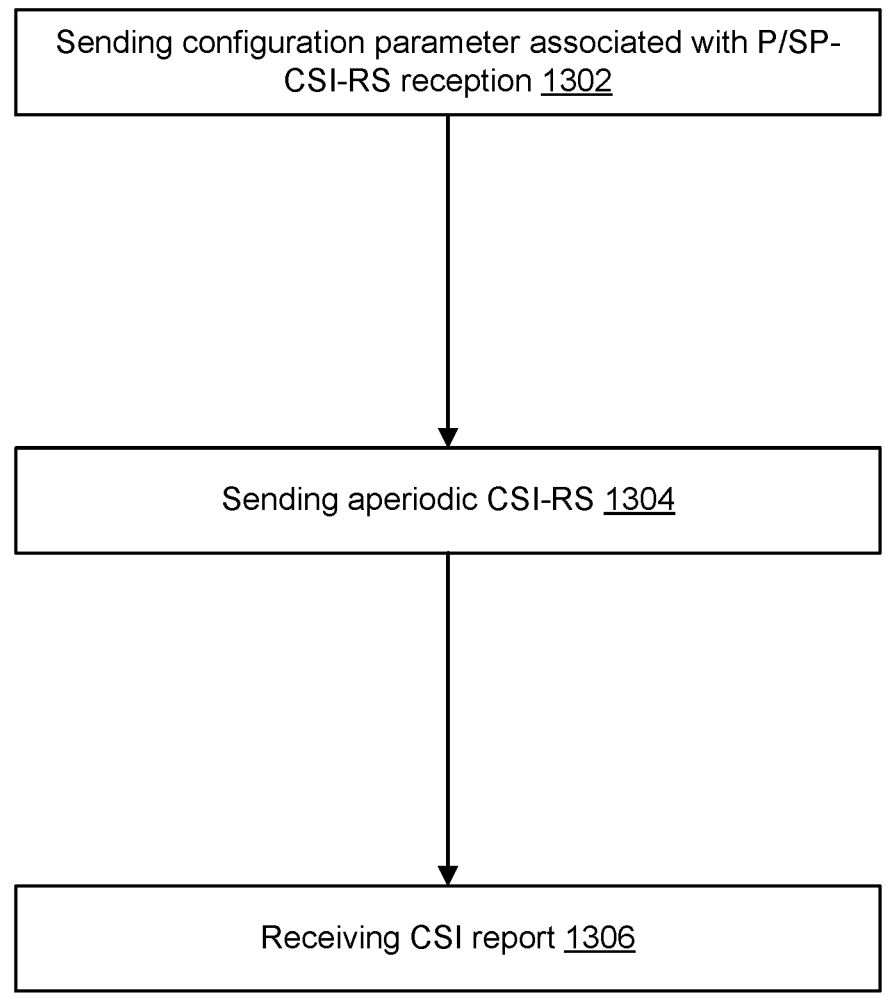
FIG. 13 illustrates an example of an operational flow/algorithmic structure for a base station to configure a UE with periodic or semi-persistent CSI-RS reception and to subsequently indicate an aperiodic CSI-RS reception, in accordance with some embodiments.

FIG. 13 illustrates an example of an operational flow/algorithmic structure 1300 for a base station to configure a UE with periodic or semi-persistent CSI-RS reception and to subsequently indicate an aperiodic CSI-RS reception, in accordance with some embodiments. A base station can implement the operational flow/algorithmic structure 1300 to indicate aperiodic CSI reporting to a UE, when the UE was initially configured for periodic or semi-persistent CSI reporting. The operation flow/algorithmic structure 1300 may be performed or implemented by the base station such as, for example, the gNB 108, 1600, or components thereof, for example, processors 1604.

The operation flow/algorithmic structure 1300 may include, at 1302, sending, to a UE, a set of configuration parameters associated with periodic or semi-persistent reception by the UE of a CSI-RS. The CSI-RS is associated with generating a CSI report by the UE for an SCell activation. In some embodiments, the base station may send, to the UE, the CSI-RS-ValidationWith-DCI-r16 parameter but not the CO-DurationPerCell-r16, nor the SlotFormatIndicator parameters.

The operation flow/algorithmic structure 1300 may further include, at 1304, sending, to the UE, aperiodic CSI-RS. In some embodiments, the aperiodic CSI-RS is included in a set of symbols of a slot of the SCell that is being activated. To assist the UE with the reception of the aperiodic CSI-RS, the base station can send information indicating an aperiodic reception of the CSI-RS in the set of symbols of the SCell that is being activated. In some embodiments, the information includes DCI. The DCI indicates that the SCell is being activated (rather than being a serving cell) and can be processed to identify the set of symbols on a PDSCH of the SCell. In some other embodiments, the information includes cross-carrier scheduling information. The cross-carrier scheduling information may indicate the set of symbols of the PDSCH.

The operation flow/algorithmic structure 1300 may further include, at 1306, receiving, from the UE, the CSI report based on the aperiodic CSI-RS. In some embodiments, the CSI report is aperiodic. The UE may determine the symbol location of the CSI-RS based on the information and may perform the relevant measurements to generate and send the aperiodic CSI report.

Figure 14:
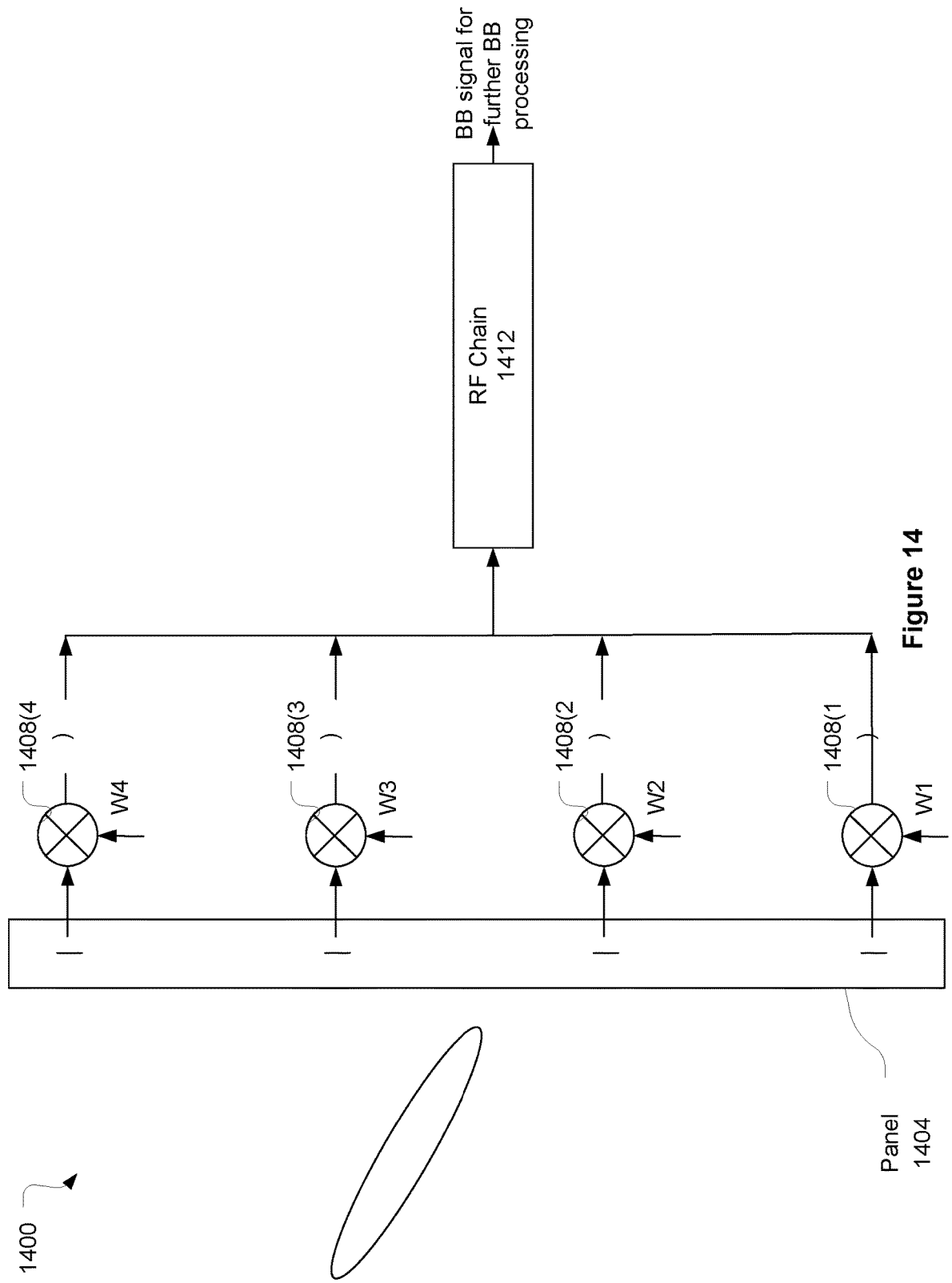
FIG. 14 illustrates an example of receive components, in accordance with some embodiments.

FIG. 14 illustrates receive components 1400 of the UE 104, in accordance with some embodiments. The receive components 1400 may include an antenna panel 1404 that includes a number of antenna elements. The panel 1404 is shown with four antenna elements, but other embodiments may include other numbers.

The antenna panel 1404 may be coupled to analog beamforming (BF) components that include a number of phase shifters 1408(1)-1408(4). The phase shifters 1408(1)-1408(4) may be coupled with a radio-frequency (RF) chain 1412. The RF chain 1412 may amplify a receive analog RF signal, downconvert the RF signal to baseband, and convert the analog baseband signal to a digital baseband signal that may be provided to a baseband processor for further processing.

In various embodiments, control circuitry, which may reside in a baseband processor, may provide BF weights (for example W1-W4), which may represent phase shift values, to the phase shifters 1408(1)-1408(4) to provide a receive beam at the antenna panel 1404. These BF weights may be determined based on the channel-based beamforming.

Figure 15:
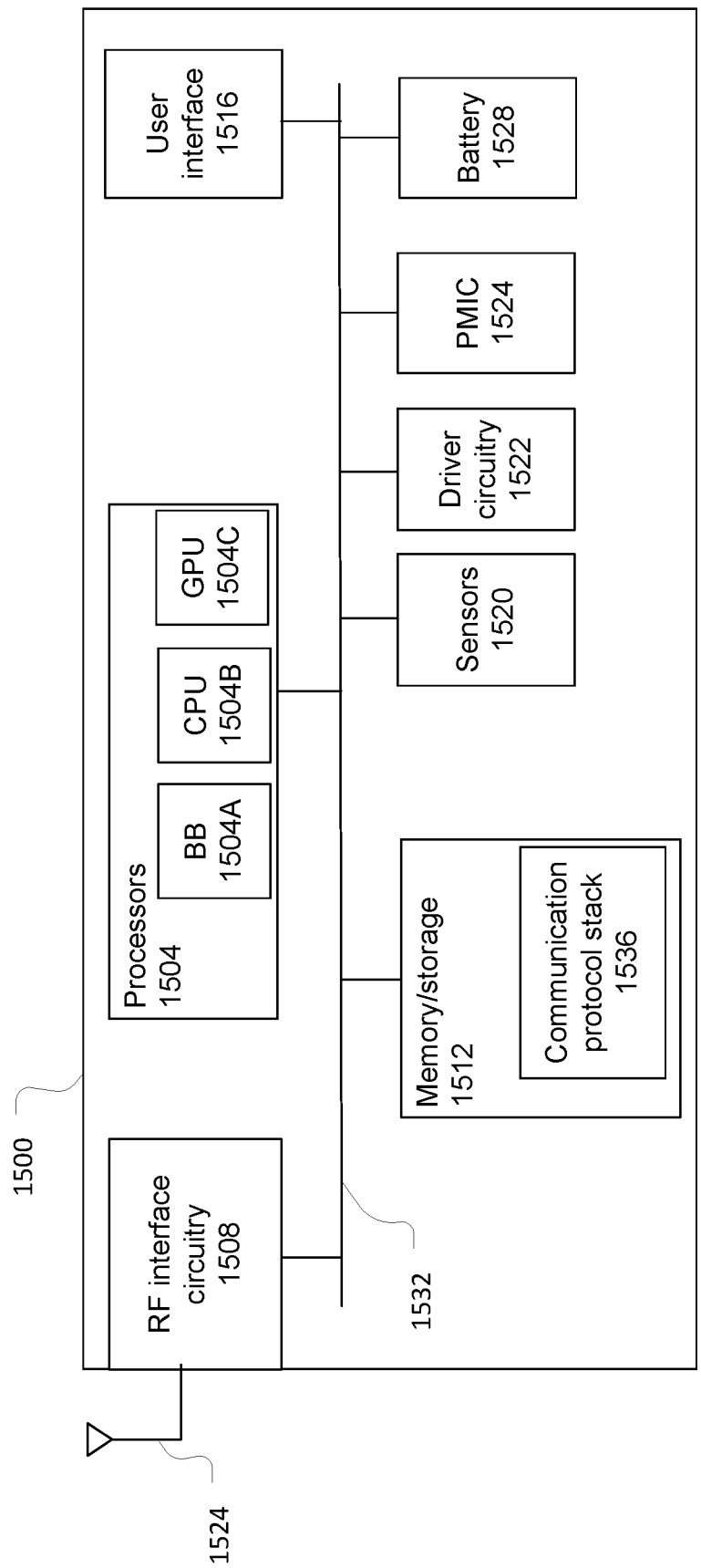
FIG. 15 illustrates an example of a UE, in accordance with some embodiments.

FIG. 15 illustrates a UE 1500, in accordance with some embodiments. The UE 1500 may be similar to and substantially interchangeable with UE 154 of FIG. 1.

Similar to that described above with respect to UE 154, the UE 1500 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices, or relaxed-IoT devices. In some embodiments, the UE may be a reduced capacity UE or NR-Light UE.

The UE 1500 may include processors 1504, RF interface circuitry 1508, memory/storage 1512, user interface 1516, sensors 1520, driver circuitry 1522, power management integrated circuit (PMIC) 1524, and battery 1528. The components of the UE 1500 may be implemented as integrated circuits (ICs), portions thereof, discrete electronic devices, or other modules, logic, hardware, software, firmware, or a combination thereof. The block diagram of FIG. 15 is intended to show a high-level view of some of the components of the UE 1500. However, some of the components shown may be omitted, additional components may be present, and different arrangements of the components shown may occur in other implementations.

The components of the UE 1500 may be coupled with various other components over one or more interconnects 1532, which may represent any type of interface, input/output, bus (local, system, or expansion), transmission line, trace, optical connection, etc. that allows various circuit components (on common or different chips or chipsets) to interact with one another.

The processors 1504 may include processor circuitry such as, for example, baseband processor circuitry (BB) 1504A, central processor unit circuitry (CPU) 1504B, and graphics processor unit circuitry (GPU) 1504C. The processors 1504 may include any type of circuitry or processor circuitry that executes or otherwise operates computer-executable instructions, such as program code, software modules, or functional processes from memory/storage 1512 to cause the UE 1500 to perform operations as described herein.

In some embodiments, the baseband processor circuitry 1504A may access a communication protocol stack 1536 in the memory/storage 1512 to communicate over a 3GPP compatible network. In general, the baseband processor circuitry 1504A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum "NAS" layer. In some embodiments, the PHY layer operations may additionally/alternatively be performed by the components of the RF interface circuitry 1508.

The baseband processor circuitry 1504A may generate or process baseband signals or waveforms that carry information in 3GPP-compatible networks. In some embodiments, the waveforms for NR may be based on cyclic prefix OFDM (CP-OFDM) in the uplink or downlink, and discrete Fourier transform spread OFDM (DFT-S-OFDM) in the uplink.

The baseband processor circuitry 1504A may also access group information 1524 from memory/storage 1512 to determine search space groups in which a number of repetitions of a PDCCH may be transmitted.

The memory/storage 1512 may include any type of volatile or non-volatile memory that may be distributed throughout the UE 1500. In some embodiments, some of the memory/storage 1512 may be located on the processors 1504 themselves (for example, L1 and L2 cache), while other memory/storage 1512 is external to the processors 1504 but accessible thereto via a memory interface. The memory/storage 1512 may include any suitable volatile or non-volatile memory such as, but not limited to, dynamic random access memory (DRAM), static random access memory (SRAM), erasable programmable read-only memory (EPROM), electrically erasable programmable read-only memory (EEPROM), Flash memory, solid-state memory, or any other type of memory device technology.

The RF interface circuitry 1508 may include transceiver circuitry and a radio frequency front module (RFEM) that allows the UE 1500 to communicate with other devices over a radio access network. The RF interface circuitry 1508 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via an antenna 1524 and proceed to filter and amplify (with a low-noise amplifier) the signal. The signal may be provided to a receiver of the transceiver that down-converts the RF signal into a baseband signal that is provided to the baseband processor of the processors 1504.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1524.

In various embodiments, the RF interface circuitry 1508 may be configured to transmit/receive signals in a manner compatible with NR access technologies.

The antenna 1524 may include a number of antenna elements that each convert electrical signals into radio waves to travel through the air and to convert received radio waves into electrical signals. The antenna elements may be arranged into one or more antenna panels. The antenna 1524 may have antenna panels that are omnidirectional, directional, or a combination thereof to enable beamforming and multiple input, multiple output communications. The antenna 1524 may include microstrip antennas, printed antennas fabricated on the surface of one or more printed circuit boards, patch antennas, phased array antennas, etc. The antenna 1524 may have one or more panels designed for specific frequency bands including bands in FR1 or FR2.

The user interface circuitry 1516 includes various input/output (I/O) devices designed to enable user interaction with the UE 1500. The user interface 1516 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes (LEDs) and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 1500.

The sensors 1520 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers; gyroscopes; magnetometers; microelectromechanical systems or nanoelectromechanical systems comprising 3-axis accelerometers; 3-axis gyroscopes; or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1522 may include software and hardware elements that operate to control particular devices that are embedded in the UE 1500, attached to the UE 1500, or otherwise communicatively coupled with the UE 1500. The driver circuitry 1522 may include individual drivers allowing other components to interact with or control various input/output (I/O) devices that may be present within, or connected to, the UE 1500. For example, driver circuitry 1522 may include a display driver to control and allow access to a display device, a touchscreen driver to control and allow access to a touchscreen interface, sensor drivers to obtain sensor readings of sensor circuitry 1520 and control and allow access to sensor circuitry 1520, drivers to obtain actuator positions of electro-mechanic components or control and allow access to the electro-mechanic components, a camera driver to control and allow access to an embedded image capture device, audio drivers to control and allow access to one or more audio devices.

The PMIC 1524 may manage power provided to various components of the UE 1500. In particular, with respect to the processors 1504, the PMIC 1524 may control power-source selection, voltage scaling, battery charging, or DC-to-DC conversion.

In some embodiments, the PMIC 1524 may control, or otherwise be part of, various power saving mechanisms of the UE 1500. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 1500 may power down for brief intervals of time and thus save power. If there is no data traffic activity for an extended period of time, then the UE 1500 may transition off to an RRC_Idle state, where it disconnects from the network and does not perform operations such as channel quality feedback, handover, etc. The UE 1500 goes into a very low power state and it performs paging where again it periodically wakes up to listen to the network and then powers down again. The UE 1500 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1528 may power the UE 1500, although in some examples the UE 1500 may be mounted and deployed in a fixed location, and may have a power supply coupled to an electrical grid. The battery 1528 may be a lithium ion battery, a metal-air battery, such as a zinc-air battery, an aluminum-air battery, a lithium-air battery, and the like. In some implementations, such as in vehicle-based applications, the battery 1528 may be a typical lead-acid automotive battery.

Figure 16:
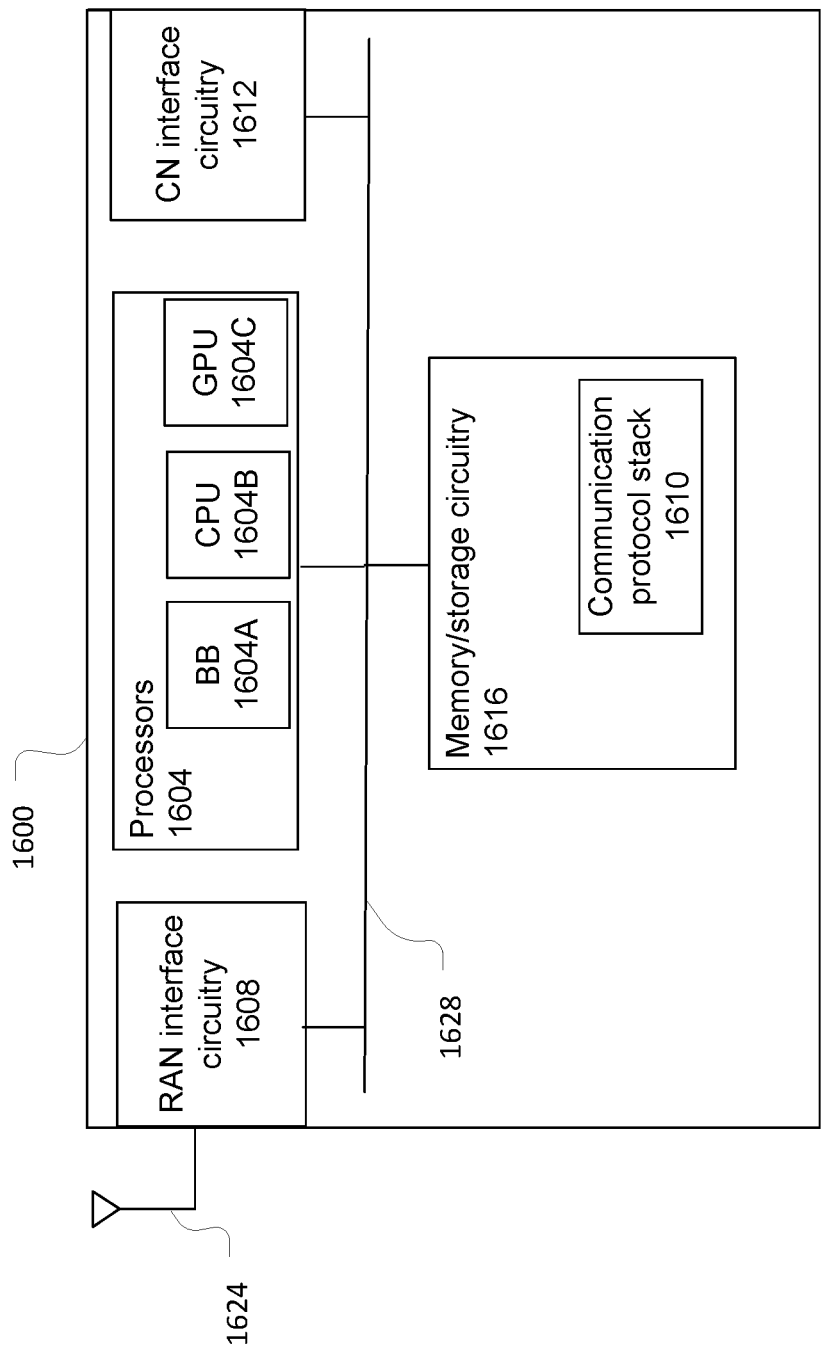
FIG. 16 illustrates an example of a base station, in accordance with some embodiments.

FIG. 16 illustrates a gNB 1600, in accordance with some embodiments. The gNB node 1600 may be similar to and substantially interchangeable with gNB 108. A base station, such as the base station 162, can have the same or similar components as the gNB 1600.

The gNB 1600 may include processors 1604, RF interface circuitry 1608, core network (CN) interface circuitry 1612, and memory/storage circuitry 1616.

The components of the gNB 1600 may be coupled with various other components over one or more interconnects 1628.

The processors 1604, RF interface circuitry 1608, memory/storage circuitry 1616 (including communication protocol stack 1610), antenna 1624, and interconnects 1628 may be similar to like-named elements shown and described with respect to FIG. 10.

The CN interface circuitry 1612 may provide connectivity to a core network, for example, a $5^{th}$ Generation Core network (5GC) using a 5GC-compatible network interface protocol, such as carrier Ethernet protocols, or some other suitable protocol. Network connectivity may be provided to/from the gNB 1600 via a fiber optic or wireless backhaul. The CN interface circuitry 1612 may include one or more dedicated processors or FPGAs to communicate using one or more of the aforementioned protocols. In some implementations, the CN interface circuitry 1612 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry, as described above in connection with one or more of the preceding figures, may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method implemented by a user equipment (UE), the method comprising: receiving, from a base station, information for a secondary cell (SCell) activation; starting, based on the information, an SCell activation procedure; canceling reception of a channel state information (CSI)-reference signal (RS) sent by the base station, wherein the CSI-RS is associated with generating a CSI report by the UE for the SCell activation; and extending, based on said canceling reception of the CSI-RS, a duration of the Scell activation procedure.

Example 2 includes a method of example 1, wherein the duration is extended by at least a time interval that is based on a number of canceled CSI-RS occasions.

Example 3 includes a method of any preceding example, wherein the duration is extended by at least a time interval that is equal to a number of canceled CSI-RS occasions multiplied by a periodicity of CSI-RSs configured for the UE.

Example 4 includes a method of any preceding example, wherein the duration is extended by at least a time interval that is based on a number of canceled CSI-RS occasions, and wherein the method further comprises: abandoning the SCell activation procedure based on a determination that the number has reached a maximum number.

Example 5 includes a method of any preceding example, wherein the duration is extended by at least a time interval that is based on a number of canceled CSI-RS occasions and a number of unavailable CSI-RS occasions.

Example 6 includes a method of example 5, wherein the time interval has an upper bound that is based on a maximum number of canceled CSI-RS occasions, a maximum number of unavailable CSI-RS occasions, and a CSI-RS periodicity.

Example 7 includes a method of example 6, wherein the time interval is defined as: $T_{CSI\_repoting\_withCCA} = T_{CSI\_repoting} + L4*T_{CSI-RS} + X*T_{CSI-RS}$ $T_{CSI\_ReportingDelay}$, wherein: $T_{CSI\_repoting}$ is a delay that includes uncertainty in acquiring the first available CSI reference resource, UE processing time for CSI reporting, and uncertainty in acquiring the first available CSI reporting resource; T CSI-RS is the CSI-RS periodicity; $T_{CSI\_ReportingDelay}$ is an additional delay in transmission of CSI reporting due to clear channel assessment (CCA) failure in uplink; L4 is the number of unavailable CSI-RS occasions; and X is the number of canceled CSI-RS occasions.

Example 8 includes a method of example 6, wherein the time interval is defined as: $T_{CSI\_repoting\_withCCA} = T_{CSI\_repoting} + L4*T_{CSI-RS} +$ $T_{CSI\_ReportingDelay}$, wherein: $T_{CSI\_repoting}$ is a delay that includes uncertainty in acquiring the first available CSI reference resource, UE processing time for CSI reporting, and uncertainty in acquiring the first available CSI reporting resource; T CSI-RS is the CSI-RS periodicity; $T_{CSI\_ReportingDelay}$ is an additional delay in transmission of CSI reporting due to clear channel assessment (CCA) failure in uplink; and L4 is the number of unavailable CSI-RS occasions and the number of canceled CSI-RS occasions.

Example 9 includes a method of any preceding example, wherein the UE is configured by higher layers to receive periodic CSI-RS (P-CSI-RS) or semi-persistent CSI-RS (SP-CSI-RS) for an SCell to be activated, wherein the SCell has a frequency band shared between multiple radio access technologies (RATs).

Example 10 includes a method of example 9, wherein the reception of CSI-RS is canceled based on the base station not providing one or more configuration parameters to the UE and sending CSI-RS validation indication to the UE, wherein the one or more configuration parameters include at least one of: a parameter indicating a channel occupancy duration for the CSI-RS, or a parameter indicating a starting slot associated with the reception of the CSI-RS.

Example 11 includes a method implemented on a base station, the method comprising: determining that a channel state information (CSI)-reference signal (RS) is to be sent to a user equipment (UE) for CSI reporting by the UE during an activation of a secondary cell (SCell), wherein the SCell has a frequency band shared between multiple radio access technologies (RATs), and wherein the CSI-RS is at least one of a periodic CSI-RS (P-CSI-RS) or a semi-persistent CSI-RS (SP-CSI-RS); determining a requirement to avoid a cancelation of CSI-RS reception by the UE, the requirement indicating a plurality of configuration parameters to send to the UE; determining, based on the requirement, the plurality of configuration parameters including a first parameter associated with periodic or semi-persistent reception of the CSI-RS, a second parameter indicating a channel occupancy duration for the CSI-RS, and a third parameter indicating a slot associated with the CSI-RS reception; and sending the plurality of configuration parameters to the UE.

Example 12 includes a method of example 11, wherein the first parameter includes CSI-RS-ValidationWith-DCI, wherein the second parameter includes CO-DurationPer-Cell, and wherein the third parameter includes SlotFormat-Indicator.

Example 13 includes a method implemented by a user equipment (UE), the method comprising: receiving, from a base station, a configuration parameter associated with periodic or semi-persistent reception of a channel state information (CSI)-reference signal (RS) by the UE, wherein the CSI-RS is associated with generating a CSI report by the UE for a secondary cell (SCell) activation; receiving, from the base station, information indicating an aperiodic reception of the CSI-RS in a set of symbols of slot of an SCell that is being activated; generating the CSI report based on the set of symbols; and sending the CSI report to the base station.

Example 14 includes a method of example 13, wherein the information includes downlink control information indicating reception of an aperiodic CSI-RS on the SCell, and wherein the method further comprises: determining that the aperiodic CSI-RS is available in the set of symbols based on the downlink control information.

Example 15 includes a method of example 13 or 14, wherein the information includes cross-carrier scheduling information indicating reception on a physical downlink shared channel (PDSCH) of the SCell, and wherein the method further comprises determining that the aperiodic CSI-RS is available in the set of symbols on the PDSCH based on the cross-carrier scheduling information.

Example 16 includes a method of example 13, 14, or 15, wherein the UE is configured by higher layers to receive periodic CSI-RS (P-CSI-RS) or semi-persistent CSI-RS (SP-CSI-RS) for the SCell, wherein the SCell has a frequency band shared between multiple radio access technologies (RATs).

Example 17 includes a method implemented by a base station, the method comprising: sending, to a user equipment (UE), a set of configuration parameters associated with periodic or semi-persistent reception by the UE of a channel state information (CSI)-reference signal (RS), wherein the CSI-RS is associated with generating a CSI report by the UE for a secondary cell (SCell) activation; sending, to the UE, an aperiodic CSI-RS; and receiving, from the UE, the CSI report based on the aperiodic CSI-RS.

Example 18 includes a method of example 17, wherein the method further comprises sending, to the UE prior to sending the aperiodic CSI-RS, downlink control information indicating reception of the aperiodic CSI-RS on the SCell.

Example 19 includes a method of example 17 or 18, wherein the method further comprises sending, to the UE prior to sending the aperiodic CSI-RS, cross-carrier scheduling information indicating reception on a physical downlink shared channel (PDSCH) of the SCell.

Example 20 includes a method of example 17, 18, or 19, wherein the set of configuration parameters includes: CSI-RS-ValidationWith-DCI, CO-DurationPerCell, and SlotFormatIndicator.

Example 21 includes a method of example 17, 18, or 19, wherein the set of configuration parameters excludes all of: CSI-RS-ValidationWith-DCI, CO-DurationPerCell, and SlotFormatIndicator.

Example 22 includes a UE comprising means to perform one or more elements of a method described in or related to any of the examples 1-10 or 13-16.

Example 23 includes one or more non-transitory computer-readable media comprising instructions to cause a UE, upon execution of the instructions by one or more processors of the UE, to perform one or more elements of a method described in or related to any of the examples 1-10 or 13-16.

Example 24 includes a UE comprising logic, modules, or circuitry to perform one or more elements of a method described in or related to any of the examples 1-10 or 13-16.

Example 25 includes a UE comprising: one or more processors and one or more computer-readable media comprising instructions that, when executed by the one or more processors, cause the one or more processors to perform one or more elements of a method described in or related to any of the examples 1-10 or 13-16.

Example 26 includes a system comprising means to perform one or more elements of a method described in or related to any of the examples 1-10 or 13-16.

Example 27 includes a base station comprising means to perform one or more elements of a method described in or related to any of the examples 11-12 or 17-21.

Example 28 includes one or more non-transitory computer-readable media comprising instructions to cause a base station, upon execution of the instructions by one or more processors of the UE, to perform one or more elements of a method described in or related to any of the examples 11-12 or 17-21.

Example 29 includes a base station comprising logic, modules, or circuitry to perform one or more elements of a method described in or related to any of the examples 11-12 or 17-21.

Example 30 includes a base station comprising: one or more processors and one or more computer-readable media comprising instructions that, when executed by the one or more processors, cause the one or more processors to perform one or more elements of a method described in or related to any of the examples 11-12 or 17-21.

Example 31 includes a system comprising means to perform one or more elements of a method described in or related to any of the examples 11-12 or 17-21.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method implemented by a user equipment (UE), the method comprising:
receiving, from a base station, information for a secondary cell (SCell) activation;
starting, based on the information, an SCell activation procedure;
canceling reception of a channel state information (CSI)-reference signal (RS) sent by the base station, wherein the CSI-RS is associated with generating a CSI report by the UE for the SCell activation; and
extending, based on said canceling reception of the CSI-RS, a duration of the SCell activation procedure.

2. The method of claim 1, wherein the duration is extended by at least a time interval that is based on a number of canceled CSI-RS occasions.

3. The method of claim 1, wherein the duration is extended by at least a time interval that is equal to a number of canceled CSI-RS occasions multiplied by a periodicity of CSI-RSs configured for the UE.

4. The method of claim 1, wherein the duration is extended by at least a time interval that is based on a number of canceled CSI-RS occasions, and wherein the method further comprises:
abandoning the SCell activation procedure based on a determination that the number has reached a maximum number.

5. The method of claim 1, wherein the duration is extended by at least a time interval that is based on a number of canceled CSI-RS occasions and a number of unavailable CSI-RS occasions.

6. The method of claim 5, wherein the time interval has an upper bound that is based on a maximum number of canceled CSI-RS occasions, a maximum number of unavailable CSI-RS occasions, and a CSI-RS periodicity.

7. The method of claim 6, wherein the time interval is defined as: $T_{CSI\_repoting\_withCCA} = T_{CSI\_repoting} + L4*T_{CSI-RS} + X*T_{CSI-RS}\ T_{CSI\_ReportingDelay}$, wherein: $T_{CSI\_repoting}$ is a delay that includes uncertainty in acquiring the first available CSI reference resource, UE processing time for CSI reporting, and uncertainty in acquiring the first available CSI reporting resource; $T_{CSI-RS}$ is the CSI-RS periodicity; $T_{CSI\_ReportingDelay}$ is an additional delay in transmission of CSI reporting due to clear channel assessment (CCA) failure in uplink; L4 is the number of unavailable CSI-RS occasions; and X is the number of canceled CSI-RS occasions.

8. The method of claim 6, wherein the time interval is defined as: $T_{CSI\_repoting\_withCCA} = T_{CSI\_repoting} + L4*T_{CSI-RS} + X*T_{CSI-RS}$ $T_{CSI\_ReportingDelay}$, is a delay that includes uncertainty in acquiring the first available CSI reference resource, UE processing time for CSI reporting, and uncertainty in acquiring the first available CSI reporting resource; $T_{CSI-RS}$ is the CSI-RS periodicity; $T_{CSI\_ReportingDelay}$ is an additional delay in transmission of CSI reporting due to clear channel assessment (CCA) failure in uplink; and L4 is the number of unavailable CSI-RS occasions and the number of canceled CSI-RS occasions.

9. The method of claim 1, wherein the UE is configured by higher layers to receive periodic CSI-RS (P-CSI-RS) or semi-persistent CSI-RS (SP-CSI-RS) for an SCell to be activated, wherein the SCell has a frequency band shared between multiple radio access technologies (RATs).

10. The method of claim 9, wherein the reception of CSI-RS is canceled based on the base station not providing one or more configuration parameters to the UE and sending CSI-RS validation indication to the UE, wherein the one or more configuration parameters include at least one of: a parameter indicating a channel occupancy duration for the CSI-RS, or a parameter indicating a starting slot associated with the reception of the CSI-RS.

11. The method of claim 10, wherein the parameter includes at least one of: CSI-RS-ValidationWith-DCI, CO-DurationPerCell, or SlotFormatIndicator.

12. A user equipment (UE) comprising:
one or more processors; and
one or more memories storing instructions, that upon execution by the one or more processors, configure the UE to:
  receive, from a base station, a configuration parameter associated with periodic or semi-persistent reception of a channel state information (CSI)-reference signal (RS) by the UE, wherein the CSI-RS is associated with generating a CSI report by the UE for a secondary cell (SCell) activation;
  receive, from the base station, information indicating an aperiodic reception of the CSI-RS in a set of symbols of slot of an SCell that is being activated;
  generate the CSI report based on the set of symbols; and
  send the CSI report to the base station.

13. The UE of claim 12, wherein the information includes downlink control information indicating reception of an aperiodic CSI-RS on the SCell, and wherein the execution of the instructions further configures the UE to:
  determine that the aperiodic CSI-RS is available in the set of symbols based on the downlink control information.

14. The UE of claim 12, wherein the information includes cross-carrier scheduling information indicating reception on a physical downlink shared channel (PDSCH) of the SCell, and wherein the execution of the instructions further configures the UE to:
  determine that the CSI-RS received in the aperiodic reception is available in the set of symbols on the PDSCH based on the cross-carrier scheduling information.

15. The UE of claim 12, wherein the UE is configured by higher layers to receive periodic CSI-RS (P-CSI-RS) or semi-persistent CSI-RS (SP-CSI-RS) for the SCell, wherein the SCell has a frequency band shared between multiple radio access technologies (RATs).

16. A base station comprising:
one or more processors; and
one or more memories storing instructions, that upon execution by the one or more processors, configure the base station to:
  send, to a user equipment (UE), a set of configuration parameters associated with periodic or semi-persistent reception by the UE of a channel state information (CSI)-reference signal (RS), wherein the CSI-RS is associated with generating a CSI report by the UE for a secondary cell (SCell) activation;
  send, to the UE, an aperiodic CSI-RS; and
  receive, from the UE, the CSI report based on the aperiodic CSI-RS.

17. The base station of claim 16, wherein the execution of the instructions further configures the base station to:
  send, to the UE prior to sending the aperiodic CSI-RS, downlink control information indicating reception of the aperiodic CSI-RS on an SCell.

18. The base station of claim 16, wherein the execution of the instructions further configures the base station to:
  send, to the UE prior to sending the aperiodic CSI-RS, cross-carrier scheduling information indicating reception on a physical downlink shared channel (PDSCH) of an SCell.

19. The base station of claim 16, wherein the set of configuration parameters includes: CSI-RS-ValidationWith-DCI, CO-DurationPerCell, and SlotFormatIndicator.

20. The base station of claim 16, wherein the set of configuration parameters excludes all of: CSI-RS-ValidationWith-DCI, CO-DurationPerCell, and SlotFormatIndicator.

* * * * *